United States Patent [19]
Brennan

[11] Patent Number: 6,001,311
[45] Date of Patent: Dec. 14, 1999

[54] APPARATUS FOR DIVERSE CHEMICAL SYNTHESIS USING TWO-DIMENSIONAL ARRAY

[75] Inventor: Thomas M. Brennan, San Francisco, Calif.

[73] Assignee: Protogene Laboratories, Inc., Palo Alto, Calif.

[21] Appl. No.: 08/792,356

[22] Filed: Feb. 5, 1997

[51] Int. Cl.[6] .............................. B01J 19/00; B01J 19/02; B01J 19/24; B01J 19/26

[52] U.S. Cl. .......................................... 422/131; 422/130

[58] Field of Search ................................... 422/116, 131, 422/110, 111, 130

[56] References Cited

U.S. PATENT DOCUMENTS

| | | |
|---|---|---|
| 4,458,066 | 7/1984 | Caruthers et al. . |
| 4,500,707 | 2/1985 | Caruthers et al. . |
| 4,517,338 | 5/1985 | Urdea et al. . |
| 5,047,524 | 9/1991 | Andrus et al. . |
| 5,106,583 | 4/1992 | Raysberg et al. . |
| 5,378,776 | 1/1995 | Matsumura et al. . |
| 5,472,672 | 12/1995 | Brennan . |
| 5,529,756 | 6/1996 | Brennan . |
| 5,538,694 | 7/1996 | Delius . |

FOREIGN PATENT DOCUMENTS

WO 9002605  3/1990  WIPO .

OTHER PUBLICATIONS

Bray, et al., "Direct Cleavage of Peptides from a Solid Support into Aqueous Buffer. Application in Simultaneous Multiple Peptide Synthesis", *J. Org. Chem.* 56:6659–6666 (1991).

Fodor, et al., "Light–Directed, Spatially Addressable Parallel Chemical Synthesis", *Science* 251:767–773 (1991).

Khrapko, et al., "An oligonucleotide hybridization approach to DNA sequencing", *FEBS Letters* 256[1,2]:118–122 (1989).

"Oligonucleotides and Analogues, A Practical Approach", Edited by F. Eckstein, IRL Press at Oxford University Press, Oxford, New York; Tokyo, (1991).

*Primary Examiner*—Keith D. MacMillan
*Assistant Examiner*—Joseph W. Ricigliano
*Attorney, Agent, or Firm*—Flehr Hohbach Test Albritton & Herbert LLP

[57] ABSTRACT

A chemical synthesis apparatus (20) for building chemical compounds includes a head assembly (21) having an array of nozzles (22) with each nozzle or plurality of nozzles coupled to a reservoir (23) of liquid reagent (24), and a base assembly (25) having an array of reaction wells (26). A transport mechanism (27) aligns the reaction wells (26) and selected nozzles (22) in a longitudinal X-direction for deposition of liquid reagent (24) into selected reaction wells (26). A plurality of independently controllable sliders (100) move nozzle columns (41) in a lateral Y-direction for deposition of liquid reagent (24) into selected reaction wells (26). A first sliding seal (30) is positioned between the head assembly (21) and the base assembly (25) to form a common chamber (31) enclosing both the reaction well (26) and the nozzles (22) therein. A plurality of second sliding seals (120) is positioned between head assembly (21) and sliders (100). A gas inlet (70) into the common chamber (31), upstream from the nozzles (22), and a gas outlet (71) out of the common chamber (31), downstream from nozzles (22), sweeps the common chamber (31) of fumes emitted by the reagents.

95 Claims, 20 Drawing Sheets

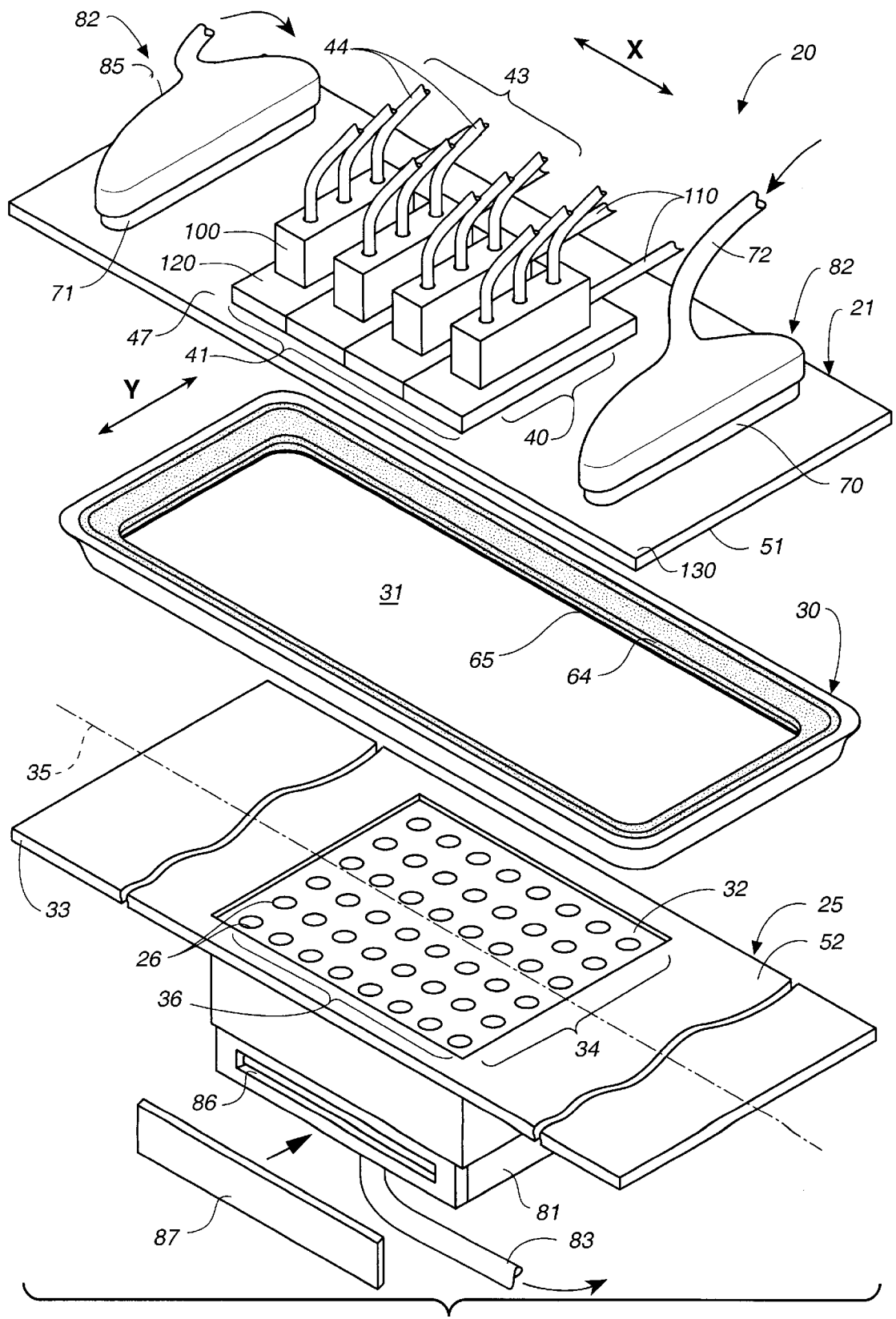
FIG._1

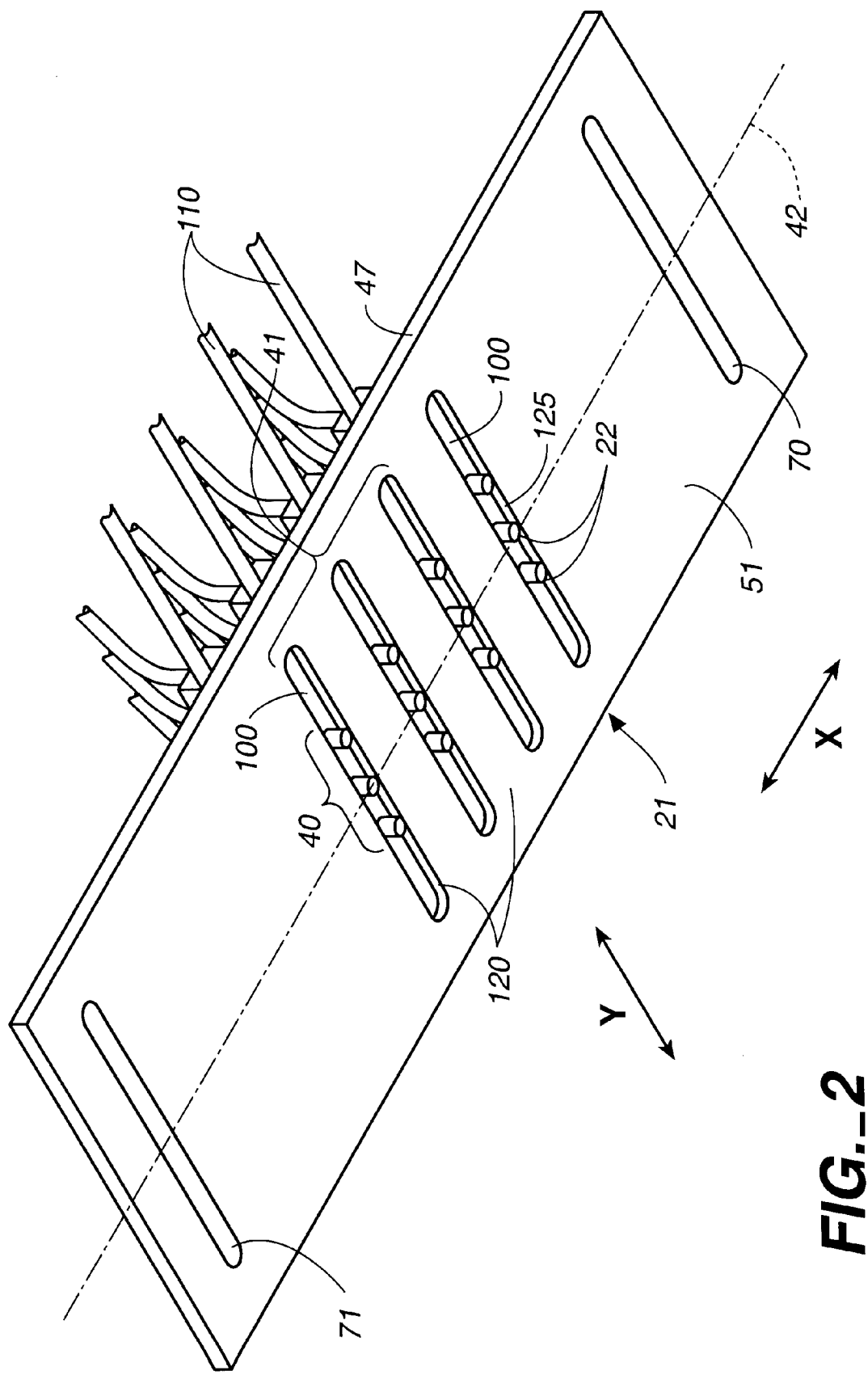
FIG._2

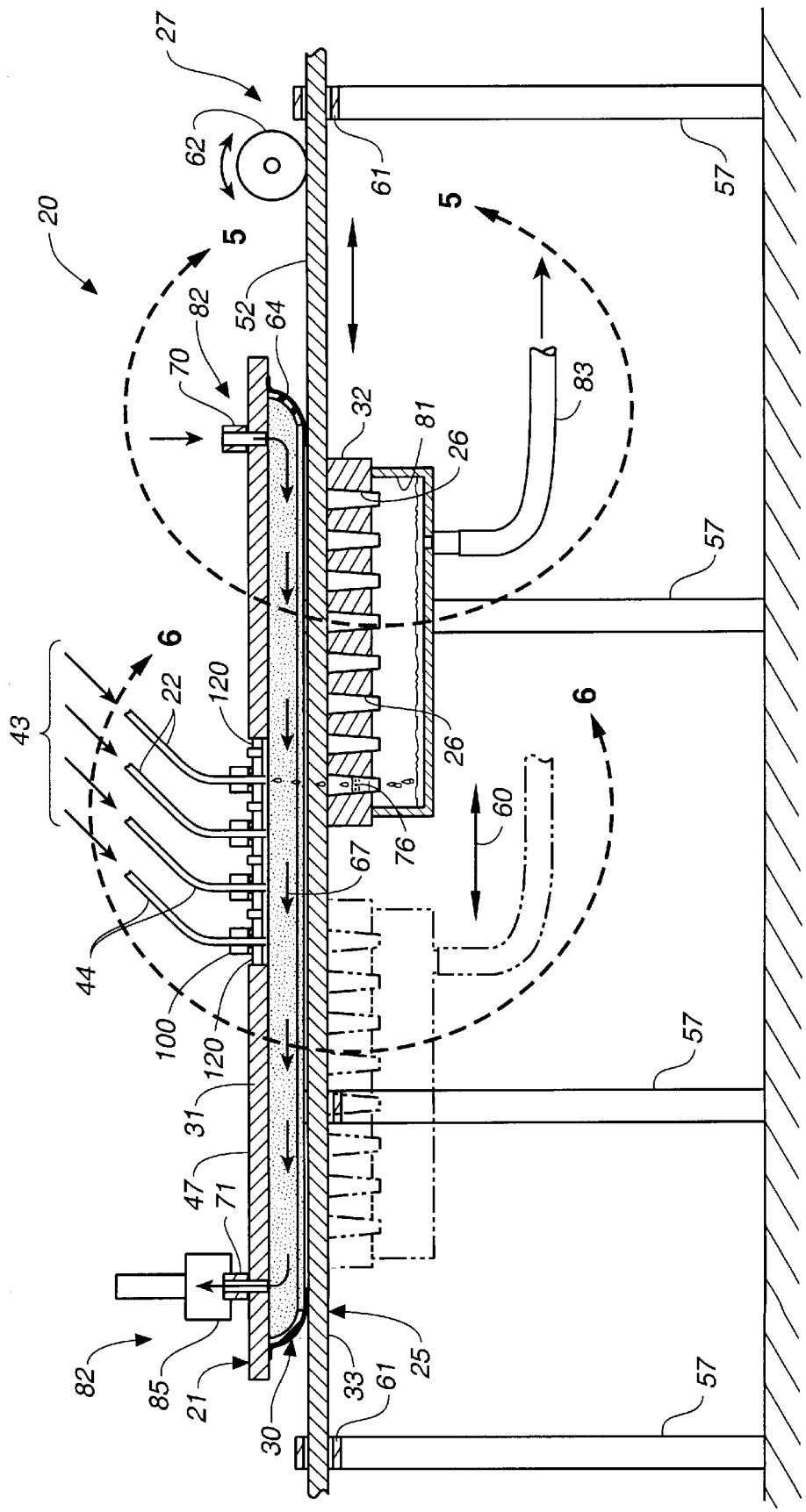
FIG._3

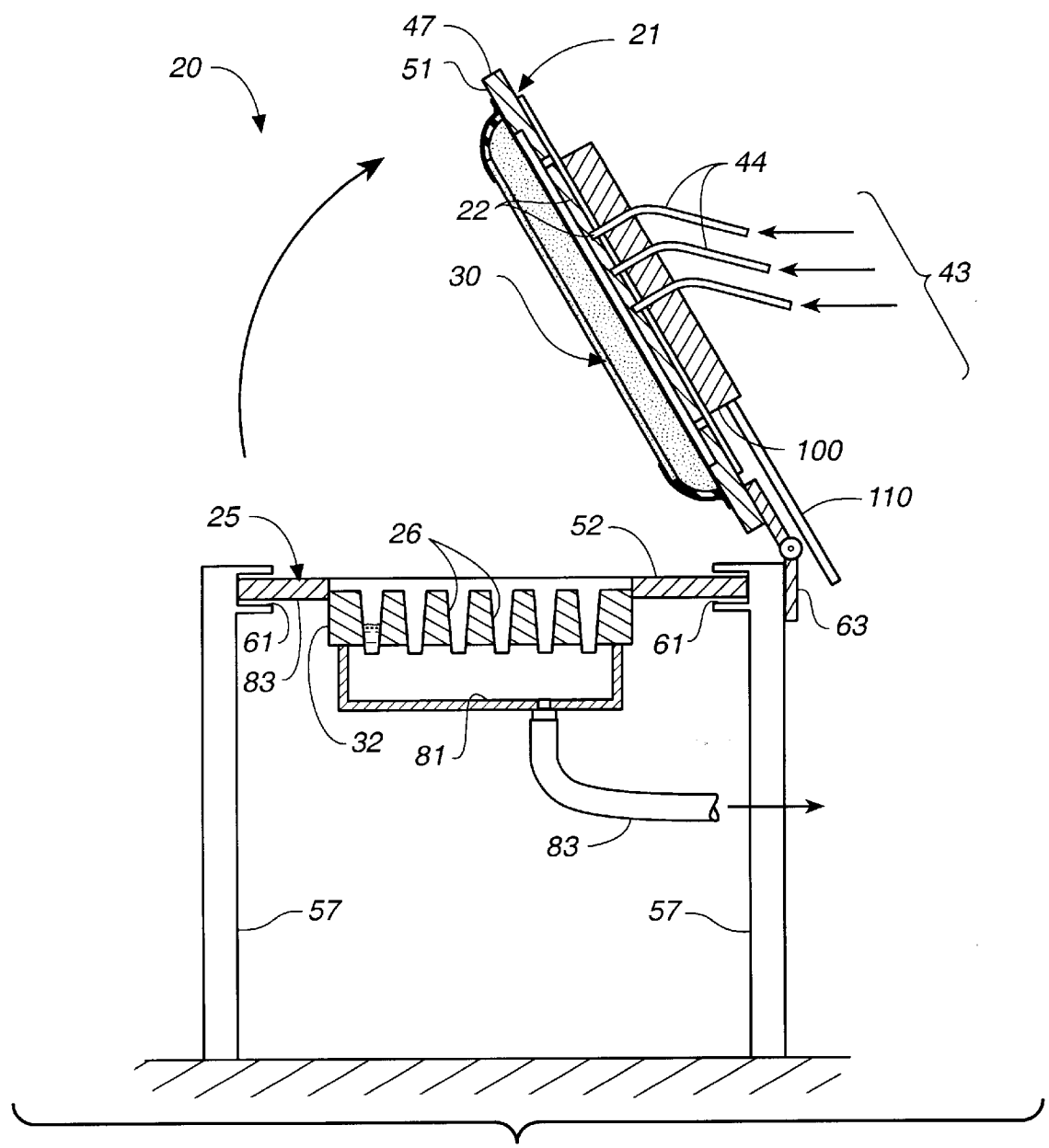
FIG._4

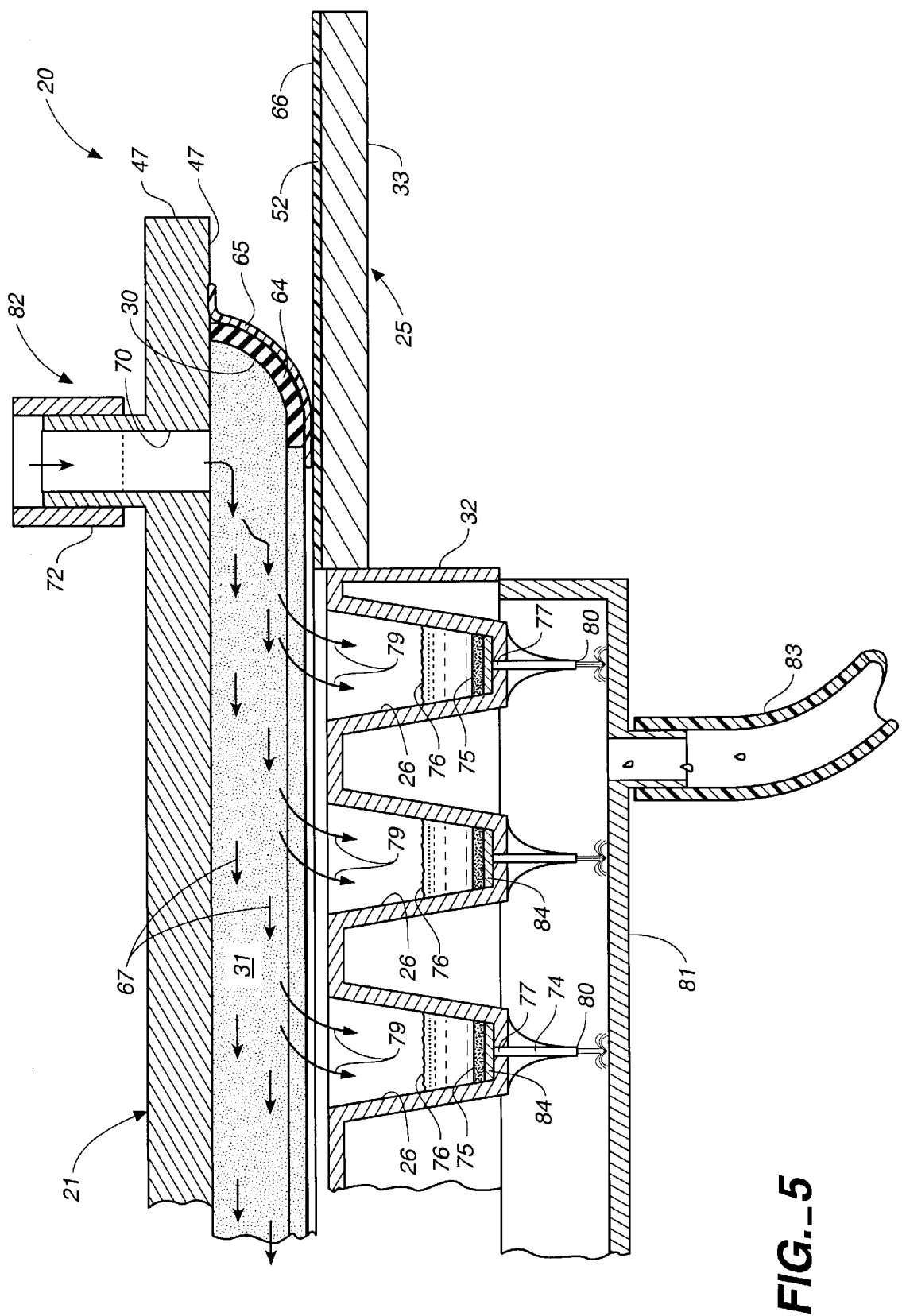
FIG._5

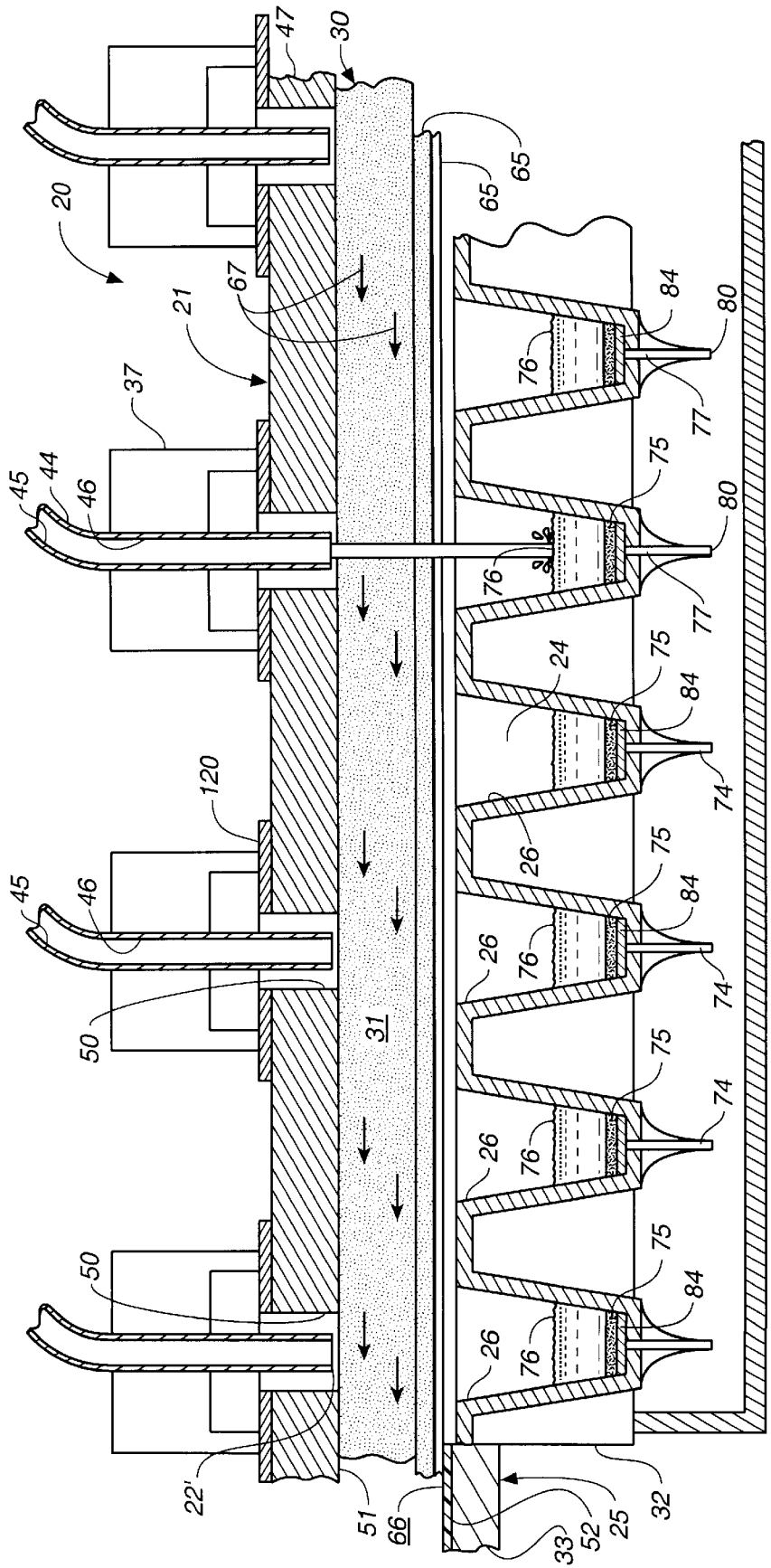
FIG._6

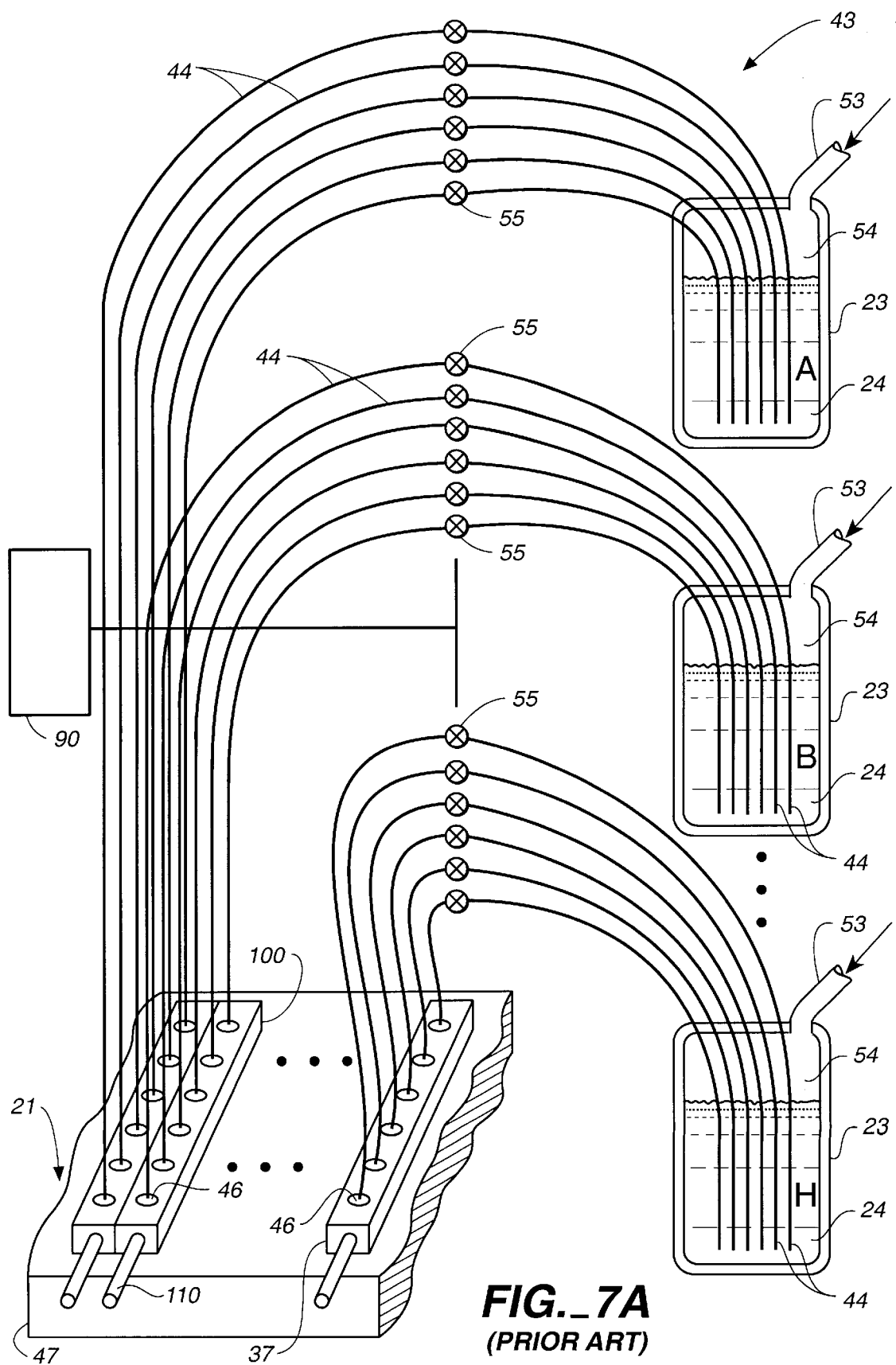
FIG._7A
*(PRIOR ART)*

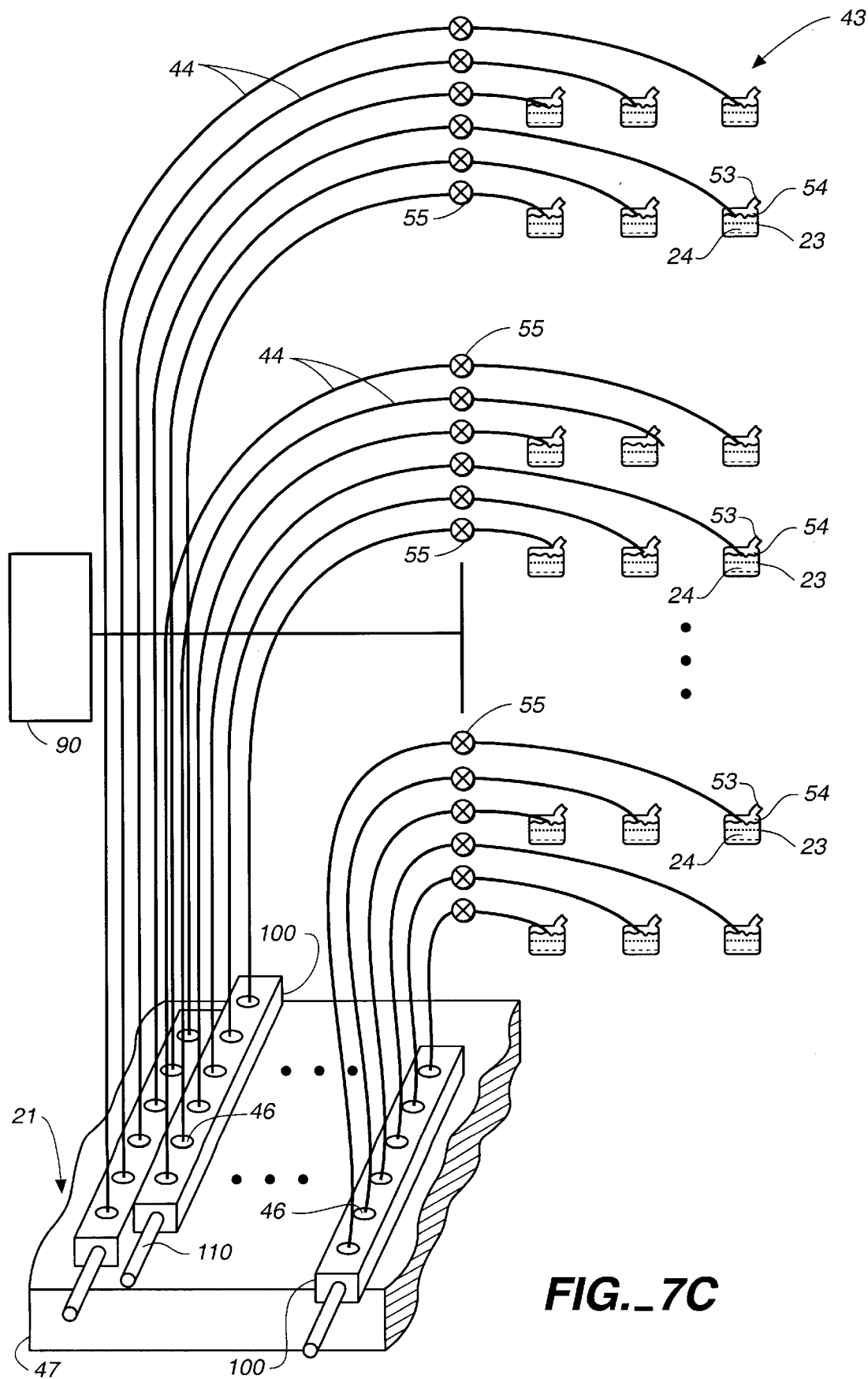
FIG._7C

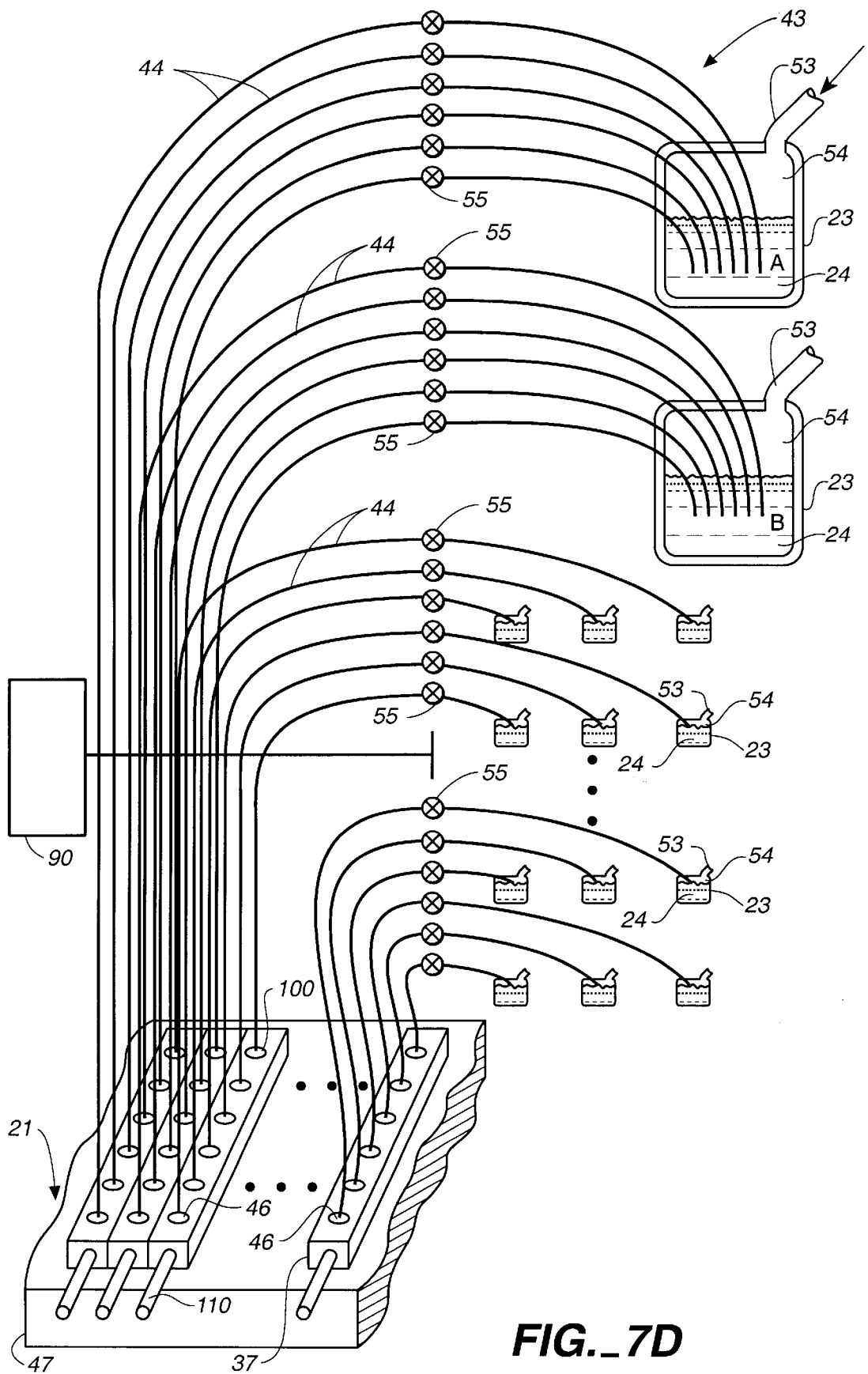
FIG._7D

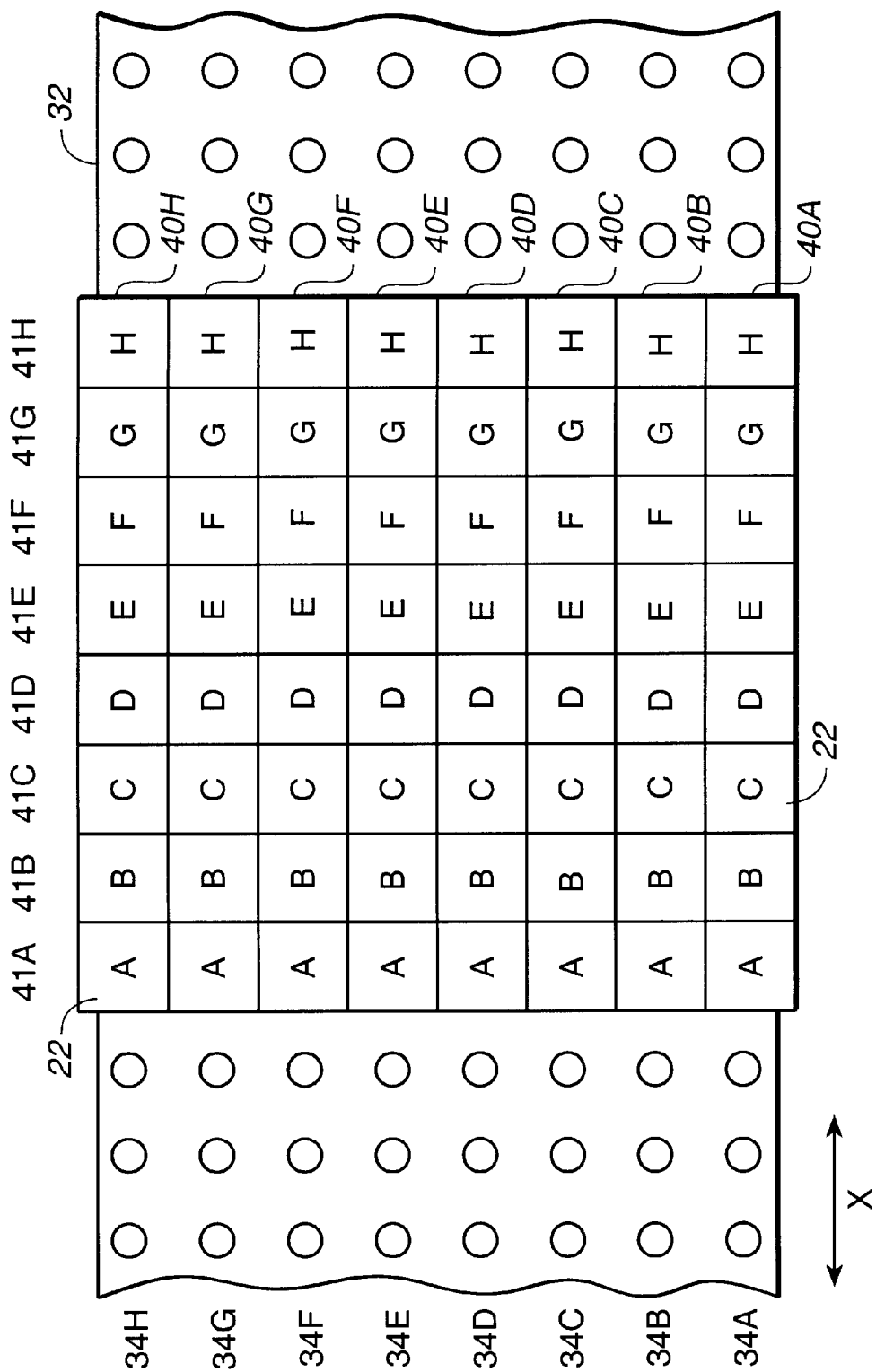
FIG._8A

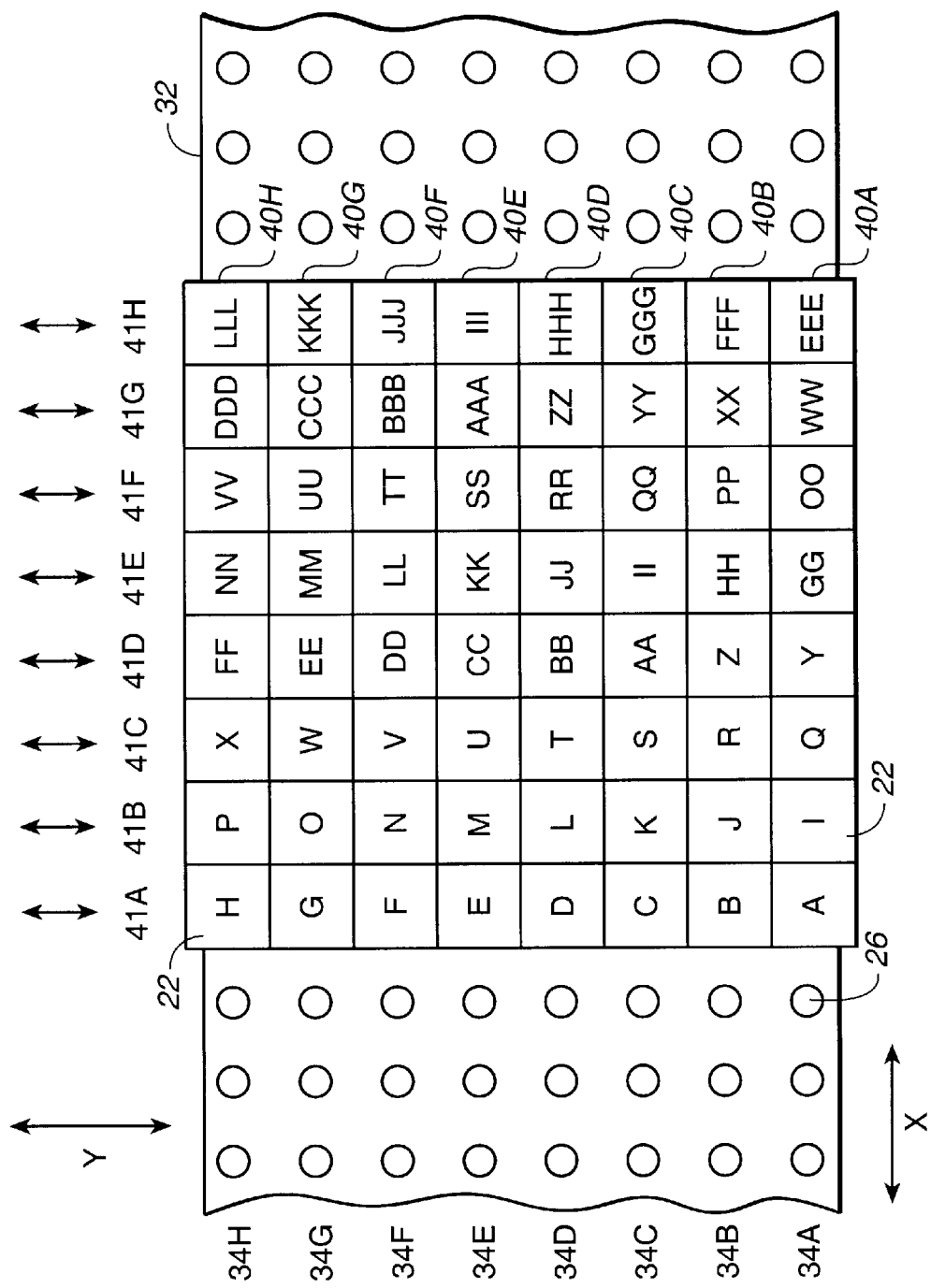
FIG._8B

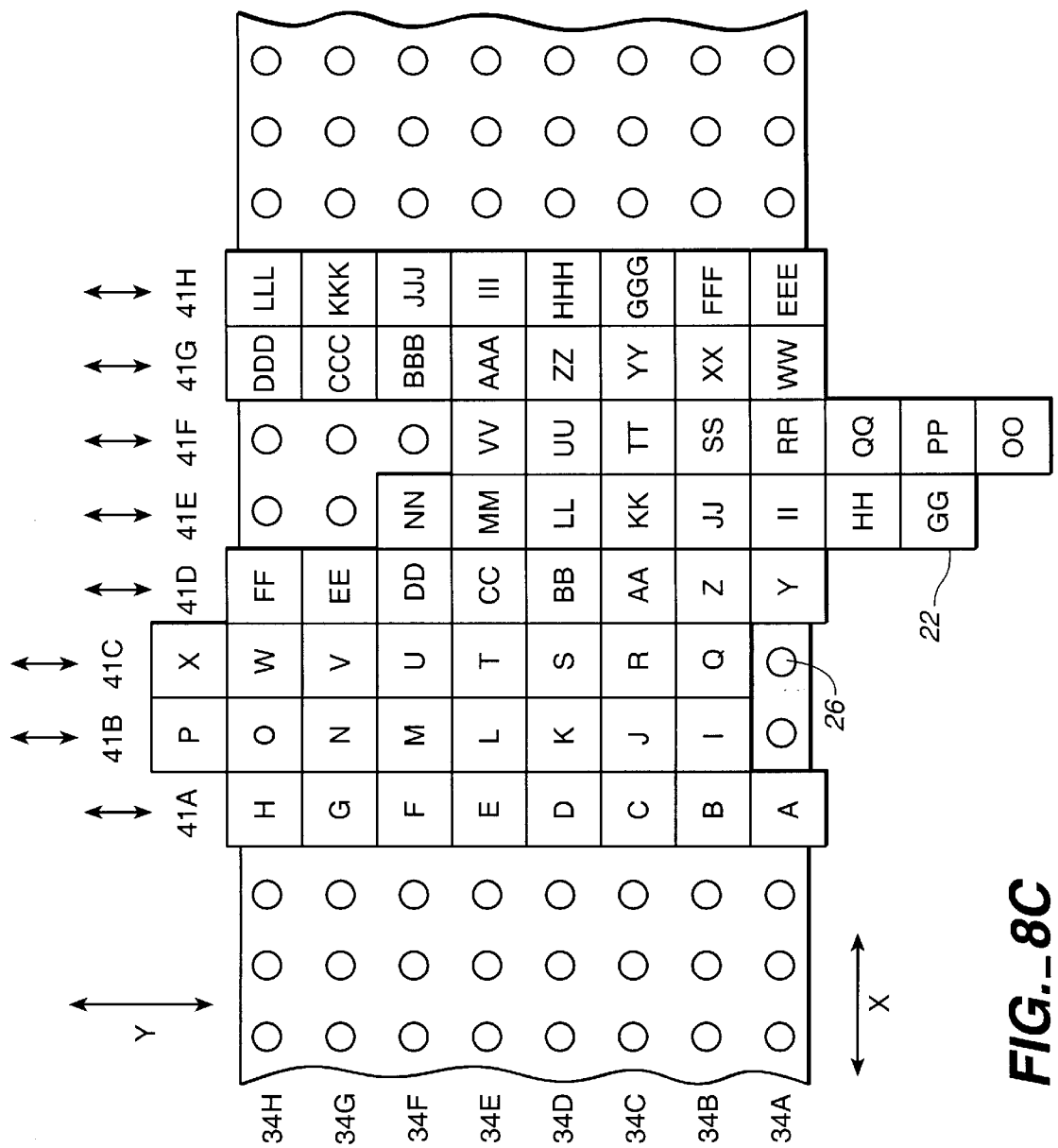
FIG._8C

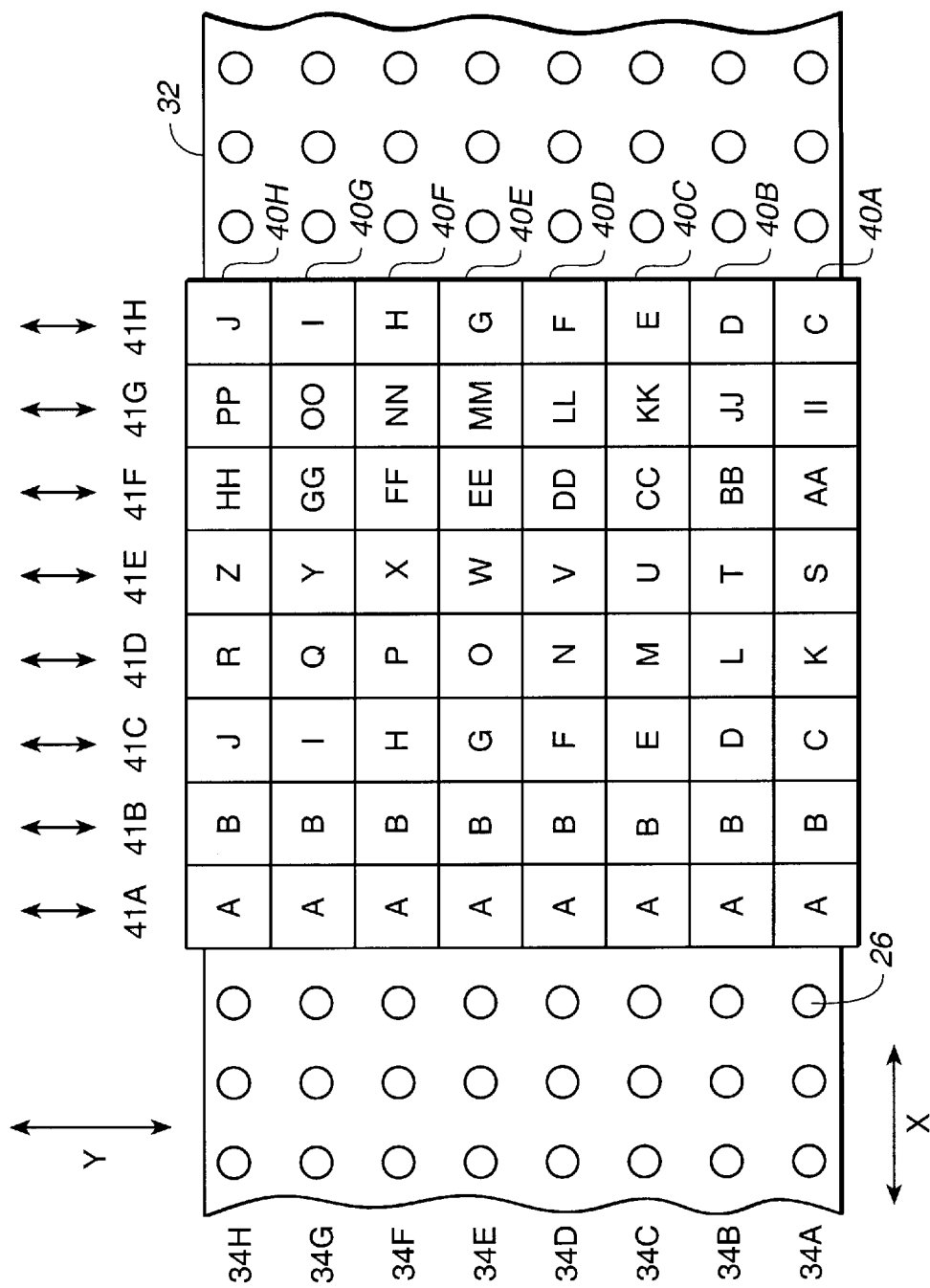
FIG._8D

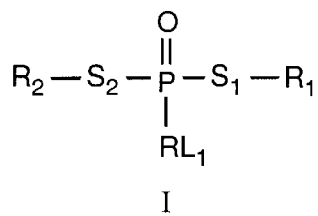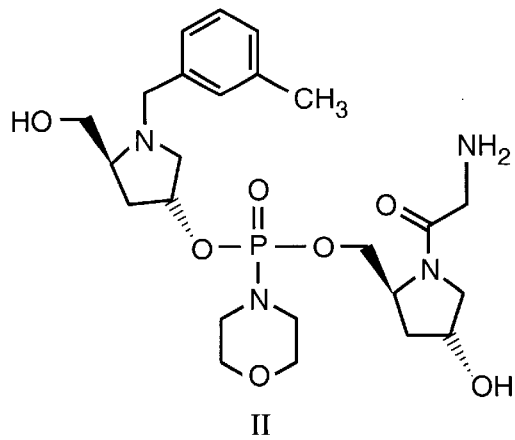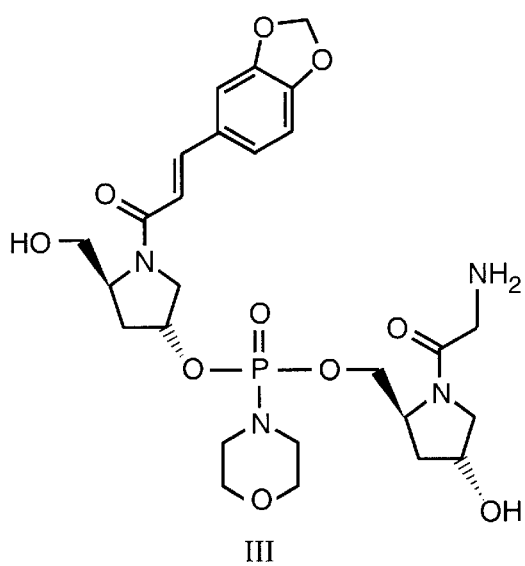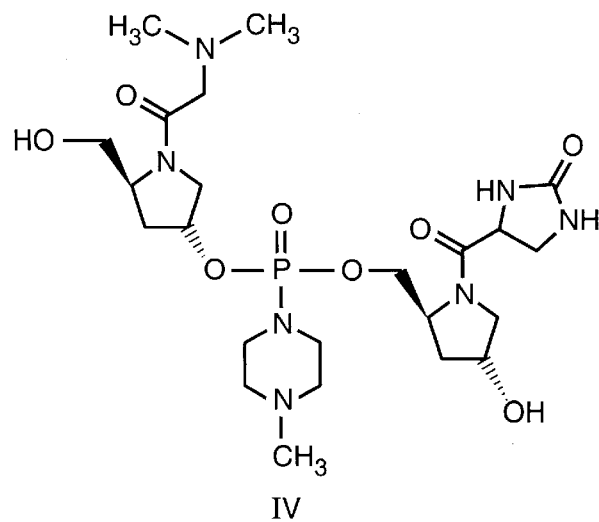
FIG._9

RL1 SEGMENT
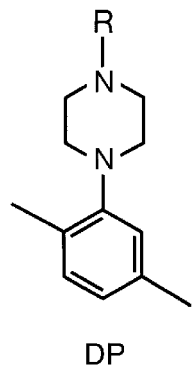
DP
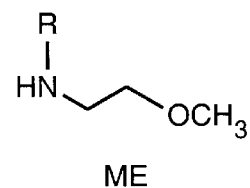
ME
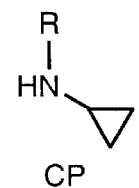
CP
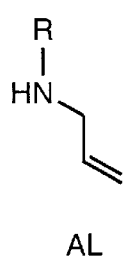
AL
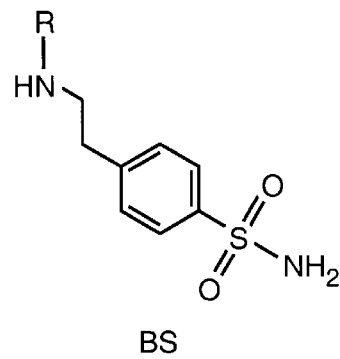
BS
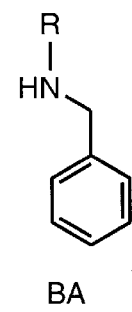
BA
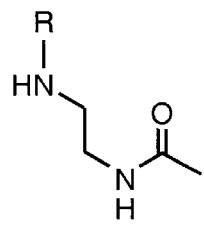
EA
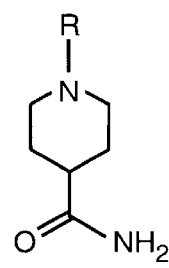
NP
R = POINT OF ATTACHMENT TO PHOSPHOROUS ATOM OF LINKER
FIG._10

R2 SEGMENT
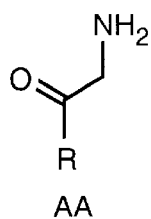
AA
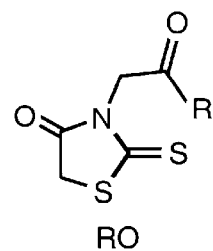
RO
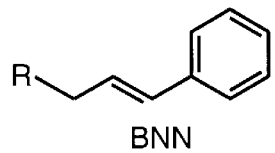
H-R NONE
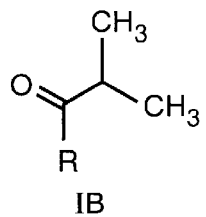
IB
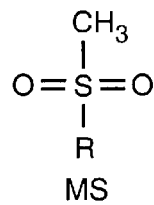
MS
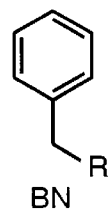
BNN
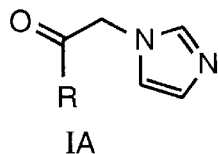
IA
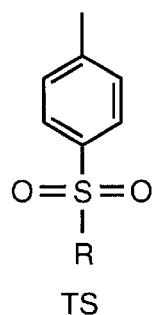
TS
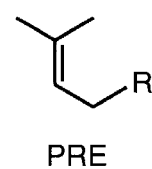
BN
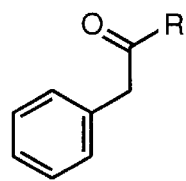
PH
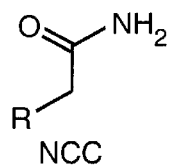
PRE
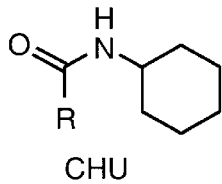
CHU
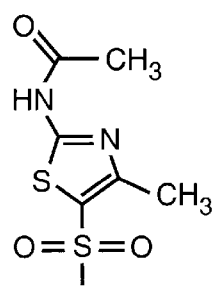
TZ
NCC
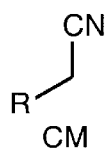
CM
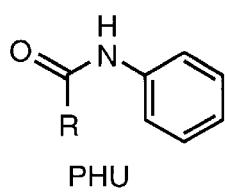
PHU
R = POINT OF ATTACHMENT TO NITROGEN ATOM OF S2
*FIG._11*

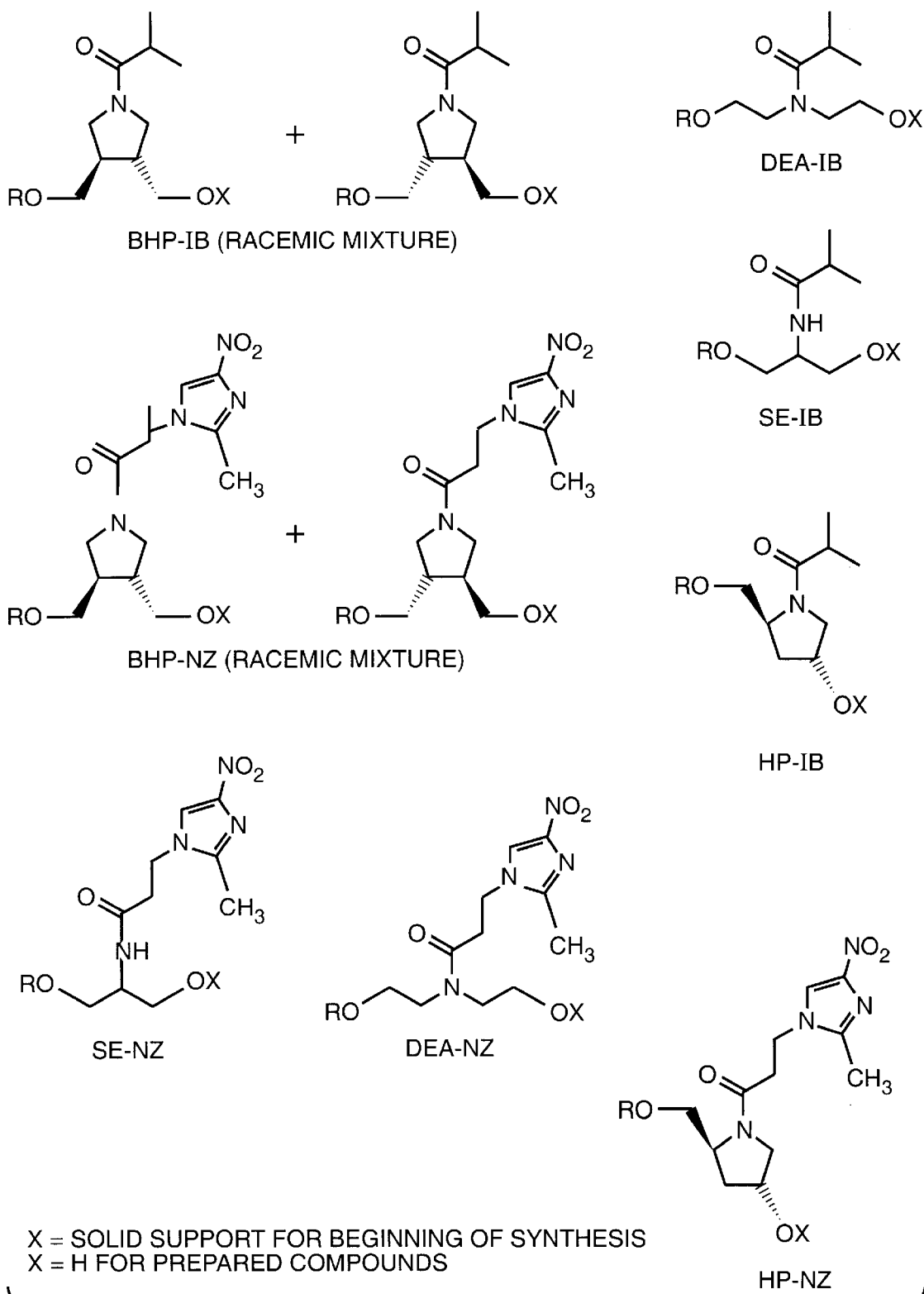
FIG._12

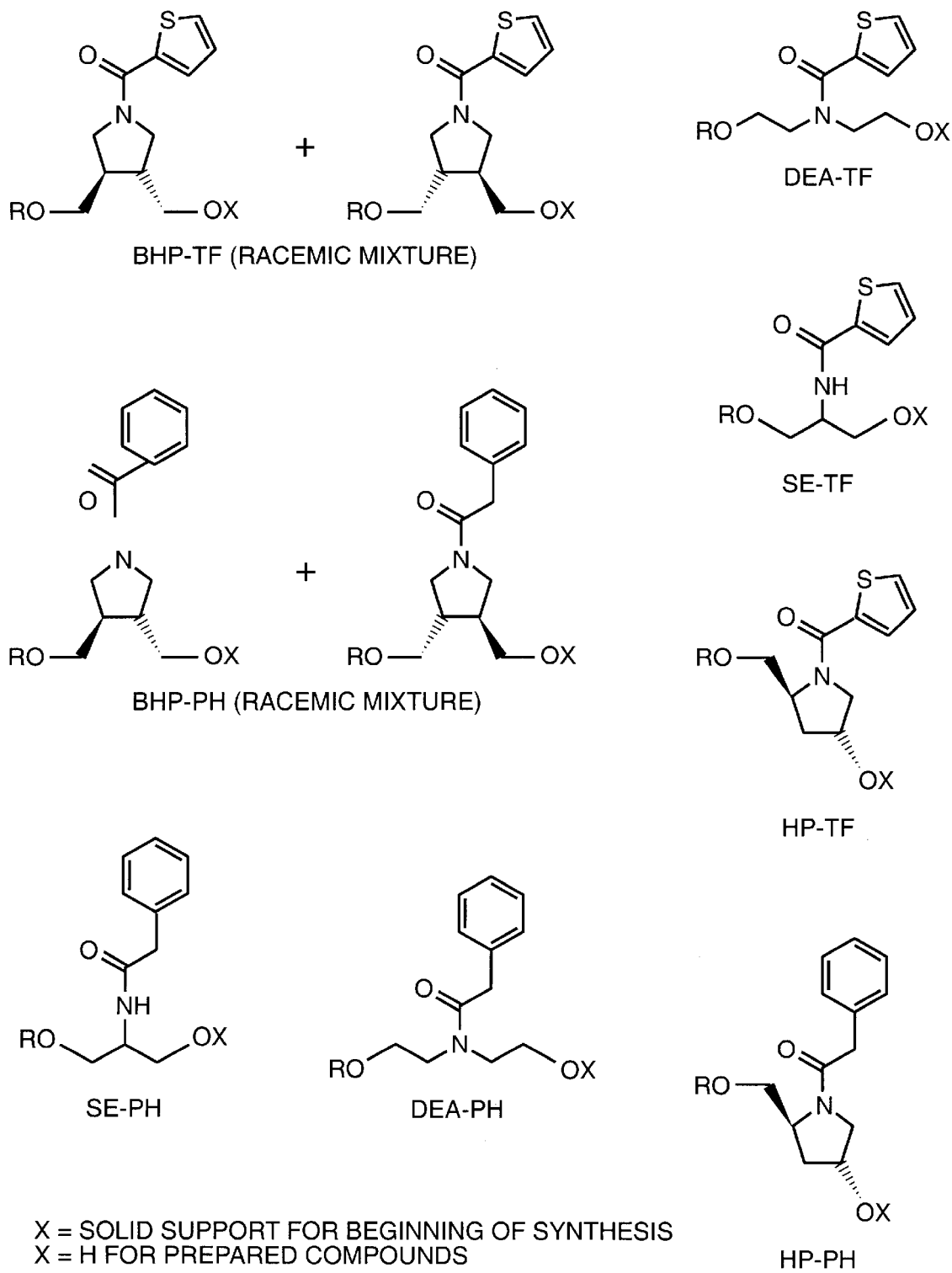
FIG._13

S2 SEGMENT
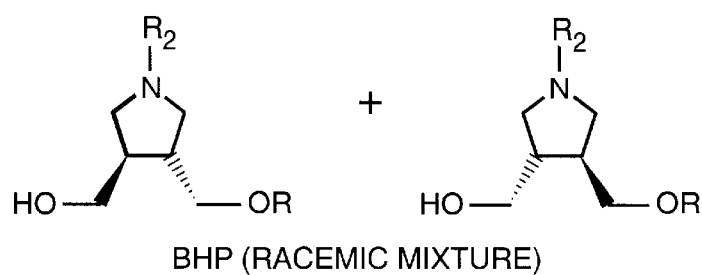
BHP (RACEMIC MIXTURE)
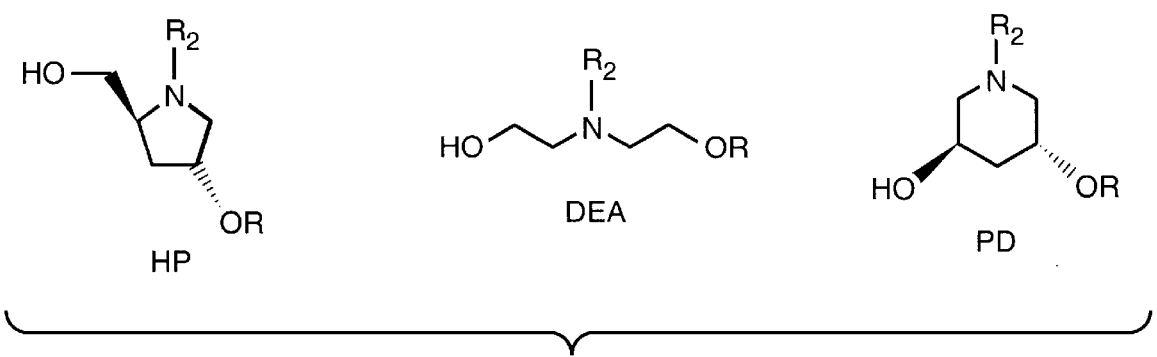
HP          DEA          PD
FIG._14

APPARATUS FOR DIVERSE CHEMICAL SYNTHESIS USING TWO-DIMENSIONAL ARRAY

TECHNICAL FIELD

The present invention relates, generally, to chemical compound synthesis apparatus, and more particularly, relates to chemical compound synthesis apparatus using arrays.

BACKGROUND OF THE INVENTION

The present invention is designed as a new and useful improvement to the invention disclosed in U.S. Pat. Nos. 5,472,672, and 5,529,756, and applications Ser. Nos. 08/452,967 and 08/453,972 (still pending) to Brennan which had provided an Apparatus and Method for Polymer Synthesis Using Arrays. The disclosures of these U.S. Patents and pending applications are incorporated herein by reference and will be herein collectively referred to as "the existing Brennan system."

In the existing Brennan system, various reagents were sequentially added to various reaction wells which were laid out in an array of columns and rows. This array of reaction wells was moved back and forth in a direction parallel to these rows by a transportation mechanism with stationary nozzles for dispensing these reagents positioned in a corresponding array of columns and rows above these reaction wells. These nozzles were connected by tubing to the various reagents and valves were selectively opened and closed as desired allowing the various reagents to pass into these various reaction wells. By moving this array of reaction wells back and forth under this stationary array of selectively opening nozzles, the various reagents were added in various sequences and combinations to the different reaction wells.

In the existing Brennan system, each of the particular reagents to be delivered were typically connected to all of the nozzles in a particular column of nozzles in the nozzle array, and the array of reaction wells was then moved back and forth in a direction parallel to the rows of reaction wells passing under these various columns of nozzles. Using this setup, each reagent could be delivered into any reaction well positioned therebelow. Unfortunately, using this particular setup for synthesis of polymers by sequentially adding various reagents into these various reaction wells was therefore limited in the actual number of reagents it was able to simultaneously utilize because all of the nozzles in each particular column of nozzles were connected to dispense the same reagent. The number of reagents which could be utilized was therefore limited by the number of columns of dispensing nozzles. Alternatively, other setups could conceivably be adapted where the various nozzles in any particular column or columns of nozzles could be connected to dispense different reagents. Unfortunately, all these alternative setups have the limitation that the various nozzles in a particular column of nozzles would not be able to dispense different reagents such that all of the various individual reaction wells in the reaction well array could be positioned so as to receive each of the various reagents being dispersed. This occurs because each row of reaction wells is movable back and forth under only one nozzle in each column of dispensing nozzles. The existing Brennan system is therefore limited in that all of the reagent dispensing nozzles cannot be aligned with all of the reaction wells. Rather, each single row of reaction wells can only be aligned with a particular single row of dispensing nozzles in the nozzle dispensing row positioned thereabove. In addition, the existing Brennan system was limited in that it was directed mainly to specific oligonucleotide polymer synthesis with limited numbers of reagents and not specifically to synthesizing other sorts of chemicals such as small molecule pharmaceuticals.

The present invention improves upon the existing Brennan system to provide the advantages of greater flexibility and a vastly increased number of reagents or other chemical units which can be simultaneously used in the synthesis of all types of chemicals. This invention also provides a method and apparatus for chemical synthesis sequentially adding reagents or other chemical units to an array of reaction wells in which a much greater number of different and more complex compounds can be simultaneously synthesized therefrom.

OBJECTS OF THE INVENTION

Accordingly, it is an object of the present invention to provide a system for chemical synthesis by sequentially adding various reagents or other chemical units to an array of reaction wells in which a vastly increased number of chemical compounds can be simultaneously synthesized than was possible in the existing Brennan system.

It is another object of the present invention to provide a system for chemical synthesis by sequentially adding an increased number of various reagents or other chemical units to an array of reaction wells such that much more complex and varied chemical compounds can be synthesized than could be achieved in the existing Brennan system.

It is another object of the present invention to provide a system for chemical synthesis by sequentially adding various reagents or other chemical units to an array of reaction wells with much greater flexibility than was previously seen in the existing Brennan system.

It is another object of the present invention to provide a system for chemical synthesis by sequentially adding various reagents or other chemical units through an array of dispensing nozzles to an array of reaction wells in which any dispensing nozzle in the nozzle array can quickly and easily be positioned so that it is able to dispense its particular reagent into any particular individual reaction well in the reaction well array.

It is another object of the present invention to provide a system for chemical synthesis by sequentially adding various reagents or other chemical units to an array of reaction wells which does not solely rely upon the back and forth movement of the array of reaction wells underneath a stationary array of reagent dispensing nozzles. Rather, it is an object of the present invention to allow selective controlled movement in the array of reagent dispensing nozzles as well as in the array of reaction wells. More specifically, the individual columns of nozzles are to be controllably moveable independently of one another in a direction perpendicular to that of movement of the array of reaction wells.

It is another object of the present invention to provide a system for chemical synthesis by sequentially adding various reagents or other chemical units to an array of reaction wells quickly and with a flexibility enabling multiple reagents or chemical units to be added very quickly to various reaction wells such that the addition of multiple reagents or chemical units occurs during the reaction of any one chemical step, enabling simultaneous reactions to occur among different reagents or chemical units in any individual reaction well.

It is another object of the present invention to provide a system for chemical synthesis by sequentially adding various reagents or chemical units to an array of reaction wells in which a large number of nozzles need not be tied up in dispensing infrequently used reagents. Rather, it is an object of the present system to be able to setup the present invention to have a greater percentage of nozzles connected to the more frequently used reagents or chemical units and a smaller percentage of the total number of nozzles to be able to be connected to the less frequently used reagents or chemical units as desired. In particular, in the present invention, as contrasted to the existing Brennan system, a full column of nozzles need not be connected to a particularly little used reagent if not desired. Rather, only a small portion of the nozzles in any particular column of nozzles need to be connected to dispense these infrequently-used reagents.

It is an additional object of the present invention to provide a system for chemical synthesis in which various reagents or other chemical units can be sequentially added to various reaction wells in an array of reaction wells without having to move this array of reaction wells.

It is an additional object of the present invention to provide a system for chemical synthesis in which various reagents or chemical units can be sequentially added to form chemical compounds on a plurality of various solid supports, e.g., glass beads variously dispensed throughout the array of reaction wells. It is a further object that these solid supports can be easily removed from any one reaction well and placed into any other reaction well, as desired, between the various steps in a chemical reaction processes such that the multitude of chemical compounds that can be simultaneously synthesized in the array is dramatically increased by simultaneously using multiple glass beads in each reaction well and by individually transferring these glass beads among the various reaction wells between various steps in a chemical reaction.

It is an additional object of the present invention to provide a system for synthesizing chemical compounds from various chemical components which in turn are synthesized from various chemical units and sub-units, with all of these various steps in the chemical synthesis process being sequentially performed by the present system.

It is another object of the present invention to provide a system for chemical synthesis by sequentially adding various reagents or chemical units to an array of reaction wells in which the number of columns of nozzles in the array can be less than the number of reagents being dispensed into the various reaction wells. Accordingly, this system would be able to dispense a very large number of reagents without necessarily requiring a correspondingly large array of dispensing nozzles be provided. (In contrast, in the existing Brennan system, the number of columns of nozzles dispensing reagents had at least equaled the number of reagents being dispensed since all of the nozzles in each column were connected to dispense each particular reagent.)

It is another object of the present invention that the number of nozzles dispensing reagents in each column of nozzles could conceivably be designed to be less than the number of reaction wells in each column of reaction wells.

It is another object of the present invention to provide a system for chemical synthesis by sequentially adding various reagents to an array of reaction wells which is adaptable to synthesize various chemical compounds such as small molecule pharmaceuticals, rather than just the polymer chains for which the system in U.S. Pat. No. 5,472,672 to Brennan was disclosed.

An object of the present invention is to provide a chemical synthesis apparatus and method for preparing large quantity arrays of chemical compounds in a reproducible and rapid manner.

An object of the present invention is to provide a chemical synthesis system which reduces reagent waste during the preparation of large quantity arrays of chemical compounds.

Still another object of the present invention is to provide a chemical synthesis system for preparing large quantity arrays of chemical compounds at reduced total and reduced per compound costs.

It is a further object of the present invention to provide a chemical array synthesis system which is durable, compact, easy to maintain, has a minimum number of components, is easy to use by unskilled personnel, and is economical to manufacture.

The assembly of the present invention has other objects and features of advantage which will be more readily apparent from the following description of the Detailed Description of the Invention and the appended claims, when taken in conjunction with the accompanying drawings.

SUMMARY OF THE INVENTION

In accordance with the foregoing objects, the present invention includes a chemical synthesis apparatus for building chemical compounds by sequentially adding chemical units in a liquid reagent, the apparatus comprising: a frame assembly; a base assembly movably mounted to the frame assembly and including an array of reaction wells aligned in a plurality of spaced-apart well rows and columns, each reaction well having at least one respective orifice extending into the well; and a head assembly mounted to the frame assembly and having an array of nozzles aligned in a plurality of nozzle rows and columns spaced apart by a distance substantially similar to the spacing between the well rows and columns for alignment therebetween, each nozzle being coupled to a reservoir of liquid reagent for controlled delivery therethrough; the columns of nozzles being independently movable; a transport mechanism coupled to the base assembly for moving support, relative the head assembly, along a path substantially perpendicular to the nozzle columns to position at least one column of reaction wells in depository alignment with at least one of the nozzles in a selected column of nozzles for simultaneous deposition of a liquid reagent into selected reaction wells for synthesis of chemical compounds, and a plurality of independently controlled sliders for individual moving support, relative the base assembly, along a path substantially parallel to the reaction well columns for moving the columns of nozzles to position at least one nozzle of the column of nozzles for deposition of a liquid reagent into at least one of the selected reaction wells for synthesis of chemical compounds.

In a preferred embodiment, the base assembly moves relative the head assembly, along a path substantially perpendicular to the nozzle columns to position at least one column of reaction wells in depository alignment with at least one of the nozzles in a selected column of nozzles for simultaneous deposition of a liquid reagent into selected reaction wells for synthesis of chemical compounds.

Furthermore, the columns of nozzles move independently relative the base assembly, along a path substantially parallel to the reaction well columns for moving the columns of nozzles to position at least one nozzle of the column of nozzles for deposition of a liquid reagent into at least one of the selected reaction wells for synthesis of chemical compounds.

Also provided is a method of synthesis of a chemical compound in a synthesis apparatus by sequentially adding chemical units thereto, the synthesis apparatus including a head assembly having a plurality of nozzles mounted thereto in generally spaced-apart relation, each nozzle being coupled to a reservoir of liquid reagent for controlled delivery therethrough, a base assembly having at least one reaction well, and a sliding seal positioned between the head assembly and the base assembly to permit relative movement therebetween, and enclosing both the reaction well and the nozzles therein to form a common chamber, the method comprising the steps of: A) aligning the reaction well and a selected one nozzle in a lateral X-direction through a transport mechanism coupled to at least one of the head assembly and the base assembly to produce relative movement therebetween; B) aligning the reaction well and a selected one nozzle in a longitudinal Y-direction through a moveable slider holding the selected one nozzle, and coupled to the head assembly to produce relative motion between the slider and the head assembly; C) depositing a liquid reagent into the well from the reagent reservoir through the one nozzle to enable synthesis of a chemical compound; D) purging gaseous fumes or reaction by-products, emitted by the reagents, from the common chamber through passage of a gas from a pressurized gas source, coupled to an inlet into the common chamber and positioned upstream from the nozzles, and out of the chamber through an outlet out from the common chamber and positioned downstream from the nozzles, and E) expelling the deposited liquid reagent from the well through an orifice extending into the well by applying a first gas pressure to the common chamber such that a pressure differential between the first gas pressure and second gas pressure exerted on an exit of the orifice exceeds a predetermined amount necessary to overcome a capillary liquid seal formed between the liquid reagent and orifice to retain the liquid reagent in the well.

BRIEF DESCRIPTION OF THE DRAWING

FIG. 1 is an exploded top perspective view of the chemical synthesis array apparatus constructed in accordance with the present invention.

FIG. 2 is a bottom perspective view of a head assembly of the chemical synthesis array apparatus of FIG. 1 illustrating the sliding seals and the Y-directional movement of the sliders of the nozzle columns.

FIG. 3 is a side elevation view, in cross-section of the chemical synthesis array apparatus of FIG. 1 and showing the sweeping action of the flow of inert gas through the common chamber and showing a cross-sectional view through the sliders and sliding seals of the nozzle columns.

FIG. 4 is a front elevation view, in cross-section of the chemical synthesis array apparatus of FIG. 1 and illustrating the head assembly pivotally mounted to a frame assembly and showing a cross-sectional view of the sliders and sliding seals of the nozzle columns.

FIG. 5 is an enlarged side elevation view, in cross-section, of the chemical synthesis array apparatus taken substantially along the line 5—5 of FIG. 3 showing the capillary liquid seal formed between the liquid reagent solution and the corresponding frit and orifice.

FIG. 6 is an enlarged side elevation view, in cross-section, of the chemical synthesis array apparatus taken substantially along the line 6—6 of FIG. 3 and illustrating the balloon seal gasket in the head assembly and the sliders and sliding seals in the nozzle columns.

FIG. 7A is an enlarged, schematic, top perspective view of the prior art delivery assembly mounted to the head assembly of the polymer synthesis array apparatus as disclosed in the existing Brennan system. In this setup, each reagent A,B, . . . H was connected to every nozzle in a particular column of nozzles in the nozzle assembly.

FIG. 7B and FIG. 7C is are enlarged, schematic, top perspective views of a first setup of the present invention's nozzle delivery assembly mounted to the head assembly of the chemical synthesis array apparatus. In this setup, reagents A, B, C, . . . through LLL are each connected to one dispensing nozzle in the nozzle array, showing the vastly increased number of reagents which can simultaneously be delivered by the present invention.

FIG. 7D is an enlarged, schematic, top perspective view of a third setup of the present invention's nozzle delivery assembly mounted to the head assembly of the chemical synthesis array apparatus. In this third setup, reagents A and C are connected to a greater percentage of dispensing nozzles than the other reagents.

FIG. 8A is a top schematic representation showing the reagents supplied through each of the nozzles in the nozzle array as corresponding to the setup shown in FIG. 7A.

FIG. 8B is a top schematic representation showing the reagents supplied through each of the nozzles in the nozzle array as corresponding to the setup shown in FIG. 7B.

FIG. 8C is a top schematic representation showing the reagents supplied through each of the nozzles in the nozzle array as corresponding to the setup shown in FIG. 7C. This FIG. 8C illustrates one example position of the separately movable nozzle columns which selectively move in the Y-direction.

FIG. 8D is a top schematic representation showing the reagents supplied through each of the nozzles in the nozzle array as corresponding to the setup shown in FIG. 7D.

FIG. 9 is a schematic of the general structures and sample compounds produced as shown in Example 1. Structure I depicts the general structure, with the variable positions being S1-R1, RL1, S2 and R2. Structures II, III and IV were prepared as described in Example 1.

FIG. 10 depicts some of the RL1 components which can be made using the present invention. The RL1 segments are one of the variable positions depicted in FIG. 9. R is the point of attachment to the phosphorus atom of linker depicted in Structure I of FIG. 9.

FIG. 11 depicts some of the R2 components which can be made using the present invention. The R2 segments are one of the variable positions depicted in FIG. 9, generally attached to an S2 nitrogen atom. R is the point of attachment to the nitrogen atom of S2, depicted in Structure I of FIG. 9.

FIG. 12 depicts some of the S1-R1 components which can be made using the present invention, using mix 1. The S1-R1 segments are one of the variable positions depicted in FIG. 9. X can be either the solid support during synthesis, or, after cleavage, will comprise a hydrogen (H) for the prepared compounds.

FIG. 13 depicts some of the S1-R1 components which can be made using the present invention, using mix 2. The S1-R1 segments are one of the variable positions depicted in FIG. 9. X can be either the solid support during synthesis, or, after cleavage, will comprise a hydrogen (H) for the prepared compounds.

FIG. 14 depicts some of the S2 components which can be made using the present invention. The S2 segments are one of the variable positions depicted in FIG. 9.

DETAILED DESCRIPTION OF THE INVENTION

Figure 7B:
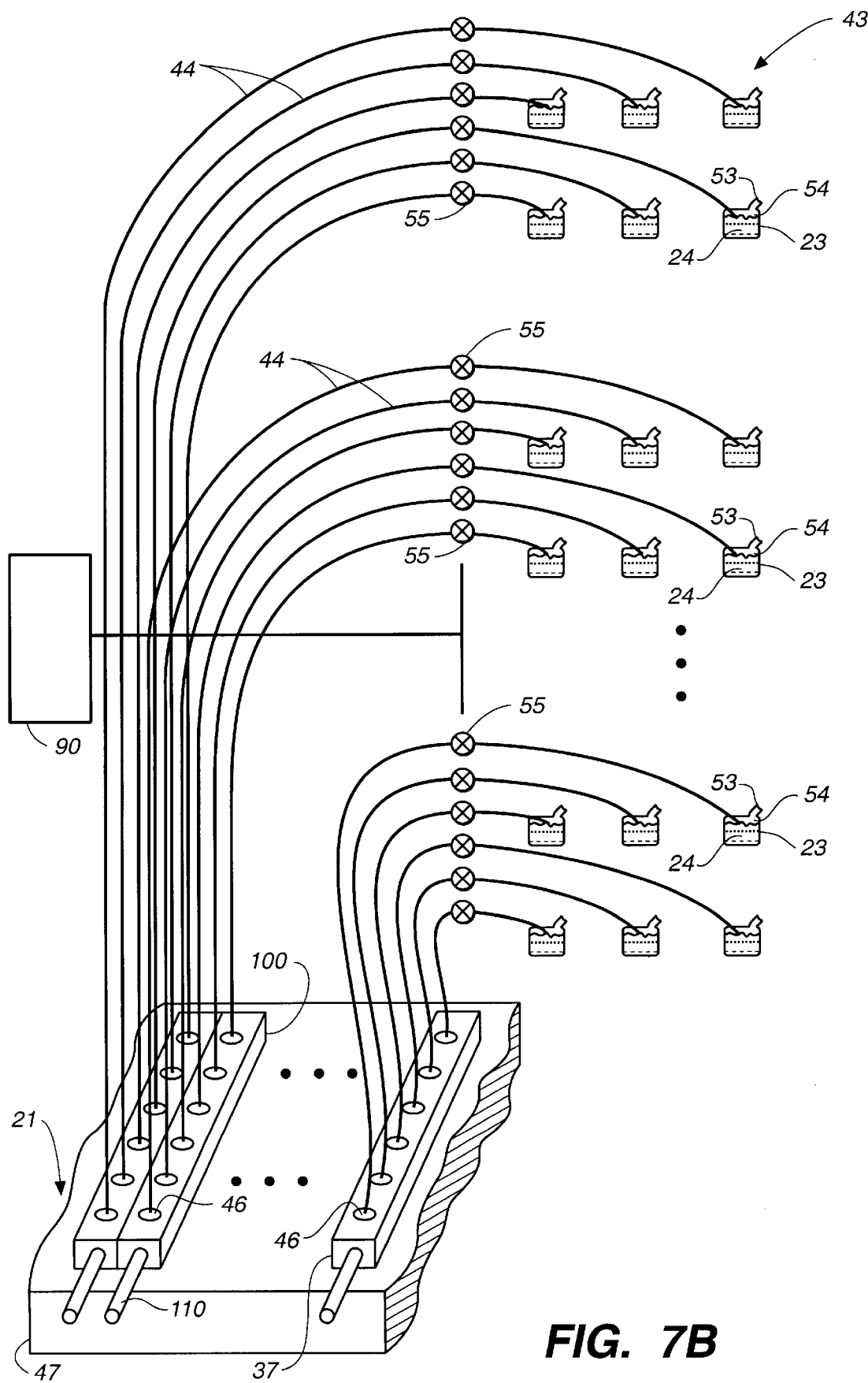

While the present invention will be described with reference to certain specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIGS. 1 and 2 where a chemical synthesis apparatus, generally designated 20, is shown as a general combinatorial synthesis instrument for building compounds by sequentially adding chemical units. Incidently, while apparatus 20 is particularly suitable for building chemical chains which may include sequence defined oligonucleotides, the present invention may be employed for synthesis of most any compound. For example, branched scaffolds may easily be used with the present invention. Hence, the term "chemical unit" will be defined as any chemical moiety or building block which can be linked to the immediately preceding chemical moiety and which in combination forms the desired chemical compound end product. It includes but isn't restricted only to those cases of a moiety that is linearly bound to other moieties of the same or a different kind to form a chain such as oligonucleotides and peptide chains in the case of compound chains. Accordingly, the present invention is adapted to synthesize any chemical composition from various chemical compounds and chemical units which are in turn synthesized from various chemical sub-units, all keeping within the scope of the present invention.

In one embodiment, the synthesis apparatus 20, briefly comprises a head assembly, generally designated 21, having a plurality of nozzles 22 (FIG. 2) mounted thereto in generally spaced-apart relation. Each nozzle 22 is coupled to one of a number of reservoirs 23 (FIG. 7) of liquid reagent 24 for controlled delivery therethrough. Further, a base assembly, generally designated 25, is included having at least one reaction well 26, and a transport mechanism, generally designated 27 (FIG. 3) coupled to at least one of head assembly 21 and base assembly 25 to produce relative movement in a longitudinal X-direction shown by arrow X, this direction running parallel to the rows 36 of reaction wells in the reaction well array therebetween. This positions a selected reaction well 26 and a selected nozzle 22 in alignment along this X-direction for deposition of a selected liquid reagent 24 into the reaction well for synthesis of a chemical compound. A sliding seal, generally designated 30, is positioned between the head assembly and the base assembly to form a common chamber 31 (FIG. 3) which encloses both the reaction well and the nozzles therein.

This plurality of nozzles 22 are received into parallel oriented sliders 100 which are adapted to move independently back and forth in a lateral Y-direction shown by arrow Y, this lateral Y-direction being perpendicular to the longitudinal X-direction shown by arrow X. Sliders 100 are independently moved back and forth by the action of rods 110 which are adapted to be connected to a mechanical actuator (not shown) such that sliders 100 can be selectively controlled to be independently moved back and forth by distances which are integer multiples of the distance between the various rows 34 of reaction wells. The reason for movement being in these particular incremental distances will be explained below. A series of sliding seals, generally designated 120, are positioned between each of sliders 100 and head assembly 21. Sliding seals 120 operate in a similar manner as sliding seal 30 such that they operate to provide a movable sliding seal, in this case, between sliders 100 and head assembly 21, and thus they also seal the common chamber 31.

In the preferred embodiment, an array of wells 26 (FIG. 1) is provided formed in a microtiter plate 32 which is carried by a sliding plate 33 of base assembly 25. The synthesis apparatus is particularly configured to employ a 96-well microtiter plate (not all wells shown for ease of illustration), aligned in 12 equally spaced-apart rows 34, each extending transverse to a longitudinal axis 35 of elongated base assembly 25, by 8 equally spaced-apart columns 36 wide. Microtiter plate 32 is preferably fabricated from a chemically inert material such as polypropylene. It, of course, will be appreciated that any number of wells, or arrangement of rows and columns, could be employed without departing from the true spirit and nature of the present invention.

In preparing chemical compounds, a delivery assembly 43 (FIGS. 7A–7D) of the synthesis apparatus, for controlling delivery of the liquid reagents through the array of nozzles, communicably couples all nozzles 22 to one of a plurality of liquid reagent reservoirs 23. As will be shown, a much greater number of reagents are able to be simultaneously used, and the various combinations of ways in which these various reagents 24 can be coupled to nozzles 22 are much greater than in the existing Brennan system, thereby offering much greater flexibility over this existing Brennan system. The numerous advantages of various setups connecting reagents 24 to nozzles 22 will be explained in greater detail herein.

The delivery assembly 43 of the present invention communicably couples each nozzle to a particular reagent reservoir 23 through independent dispensing tubes 44. Each tube includes a passageway 45 (FIG. 6) and has one end coupled to the respective nozzle and an opposite end terminating in the liquid reagent 24 contained in the reservoir 23. These tubes are press-fit into apertures 46 extending through sliders 100 and protrude through the bottom of sliding seals 120, positioned between sliders 100 and head assembly 21. The flexible and semi-resilient nature of each tube 44, preferably TEFLON® is resistant to deterioration upon contact with the reagents, and provides an adequate seal between the tubing exterior and the respective aperture.

A distal end of each tube 44, as shown in FIGS. 2 and 6, forms nozzle 22 which extends into, but not past, transversely positioned slots 50 which are formed in a bottom surface 51 of head plate 47. Accordingly, each independent nozzle 22 is recessed so as not to interfere with a top surface 52 of base sliding plate 33 during relative sliding movement therebetween along the longitudinal X-direction. As is also shown, the independent movement of sliders 100 and their accompanying sliding seals 120 in the lateral Y-direction, also does not interfere with top surface 52 of base sliding movement therebetween along the longitudinal X-direction, due to sliders 100 and sliding seals 120 being positioned above top surface 52 of base assembly 25. Further, the independent extension of each nozzle into slots 50 promotes removal or discarding of residual liquid reagent accumulated at the end of the nozzle after delivery of reagent therefrom.

The basic array technique for sequence defined oligonucleotide synthesis first evolved from the high density oligonucleotide array chip assembly for hybridization sequencing disclosed in U.S. patent application Ser. No. 07/754,614, filed Sep. 4, 1991, now abandoned, and continuation-in-part filed May 27, 1993, now U.S. Pat. No. 5,474,796. Hence, this array technique, alone, is not claimed as a novel feature of the present invention.

In a preferred embodiment, when the various columns 41 of nozzles are in a null or rest position, as shown in FIGS. 1, 8B, 8C, and 8D, each nozzle 22 in a particular bank or row 40 of nozzles corresponds to and is aligned with a respective column 36 of wells 26. The nozzles in any one row 40 and column 41 are also equally spaced-apart by the same distance as the spacing between the well rows 34 and columns 36 which permit simultaneous alignment between one or more well rows 34 with selected nozzle rows 40 during a single cycle of movement of head assembly 21 in the longitudinal X-direction. That is, the array of wells can be aligned with the array of nozzles along a plurality of positions for simultaneous deposition as head assembly 21 moves in the longitudinal X-direction. In addition, sliders 100 afford Y-directional movement of the independent nozzle columns 41 such that, by moving distances which are integer multiples of the separation distance between the reaction wells in parallel rows 34, nozzle columns 41 can be individually aligned at a plurality of positions in the Y-direction for simultaneous deposition from the nozzle array into the reaction well array.

FIG. 1 also illustrates that nozzles 22, mounted to head assembly 21, are aligned into an array of nozzle rows 40 and columns 41 similar to the array of wells 26 therebelow. However, since each of the columns 41 of nozzles 22 are independently movable in the Y-direction upon sliders 100 by rods 110 such that, any of the nozzles in any particular column can be positioned over any of the reaction wells 26 found in any of well rows 34. This Y-directional movement of nozzles in the nozzle array offers multiple advantages which could not be provided in the existing Brennan system.

In contrast, in this existing Brennan system, schematically illustrated in FIGS. 7A and 8A, in which Y-directional nozzle movement was not possible, the dispensing nozzles for reagent A were, for example, all located along nozzle column 41A in FIG. 8A such that this reagent could be dispensed into any reaction well. Accordingly, to add reagent A to any particular reaction well, microtiter plate 32 was moved such that the desired reaction well, (which, for example, may lie in any of well rows 36A, 36B, . . . 36H), would be positioned under one of the nozzles in column 41A dispensing reagent A. A limitation of this existing Brennan system, as best seen schematically in FIG. 8A, was that only the nozzles in row 40A could be positioned over reaction wells in row 36A, and only the nozzles in row 40B could be positioned over reaction wells in row 36B, etc. Accordingly, in this existing Brennan system, at least one of nozzles 22 from each of columns 41A, 41B, 41C, 41D, 41E, 41F, 41G and 41H were always connected to a common liquid reagent reservoir 23. This was necessary because, as shown in FIGS. 7A and 8A, for any reaction well 26, positioned in any of rows 36A, 36B, 36C, 36D, 36E, 36F, 36G and 36H to be able to receive each of the various reagents A, B, C, D, E, F, G and H at least one nozzle in each of columns 41A, 41B, 41C, 41D, 41E, 41F, 41G and 41H must be connected to each reagent. (Incidentally, only eight rows and eight columns of nozzles are shown for the ease of illustration).

In the present invention, however, nozzle columns 41 are selectively moveable back and forth in the Y-direction (as shown in FIG. 8C) while microtiter plate 32 remains moveable in the X-direction. The advantages of this Y-directional nozzle movement coupled with X-directional reaction well movement are very numerous and will be detailed below.

Most importantly, in the present invention, any nozzle 22 anywhere in the nozzle array can be positioned over any reaction well 26 in microtiter plate 32. Therefore, unlike the existing Brennan system, a row 36 of reaction wells is not limited to movement under only a single row 40 of stationary nozzles. Consequently, as all of the various nozzles in the present system are capable of delivering their particular reagents into any of the reaction wells in the microtiter plate, as desired, (and regardless of in which rows the various reaction wells are found), the present invention provides much greater flexibility in the addition of the various sequences of reagents into these reaction wells than was seen in the existing Brennan system.

As seen in FIGS. 7B/7C, 8B and 8C, the maximum variety and complexity of different compounds which the present system is actually able to simultaneously synthesize is immediately and dramatically increased from the prior art by a factor equal to the number of rows 40 in the nozzle array since each individual nozzle can now be connected to dispense a different reagent. In this illustration, shown having eight rows 40 and eight columns 41 of nozzles, 64 different reagents (A through LLL), can be simultaneously used, being each dispensed to any reaction well in the array as desired. In contrast, the existing Brennan system (FIG. 8A) was only able to simultaneously dispense eight reagents when having eight columns 41, as the number of reagents to be dispensed could not exceed the number of columns 41 of dispensing nozzles 22 if each reagent was to be dispensed into each reaction well.

This most important advantage of having nozzle columns 41 movable back and forth in the Y-direction, thus enabling any nozzle 22 to be positioned above any reaction well 26, provides increased flexibility in which the various reagents may be connected to the different nozzles. Specifically, as nozzle columns 41A, 41B, 41C, 41D, 41E, 41F, 41G and 41H are able to independently move to various positions, as shown in FIG. 8C, the various reagents can be connected to the nozzle array as is shown schematically in the various setups of FIGS. 7B/7C, 7D, 8B, 8C, and 8D. By simultaneously being able to move rows 36 of reaction wells and columns 41 of nozzles, any of the various reagents A through LLL can be delivered to any of the reaction wells on the reaction well array. As revealed by FIG. 8C, the Y-directional movement of nozzle columns 41, coupled with the X-directional movement of plate 32 enables any reaction well to be placed under a nozzle dispensing any of the various reagents as desired. Accordingly, any nozzle contained in the array may be communicably coupled to any reagent reservoir for delivery into any desired reaction well avoiding the need for all of the dispensing nozzles in any particular column of nozzles to be connected to dispense a single reagent.

A consequent important advantage of this system is that, being able to simultaneously dispense a much larger variety of reagents or other chemical units than in the existing Brennan system, the present invention is able to synthesize an increased variety and complexity of different compounds simultaneously.

A further advantage of simultaneously dispensing a larger number of different reagents or other chemical units is that the present invention is able to generate much more complex mixtures of chemical compounds than could be performed with the existing Brennan system.

As is shown in FIGS. 7D and 8D, which illustrates only one of a large number of ways various reagents can be dispensed through the present system, a near-infinite amount of flexibility can be achieved with the present invention as any reagent can be dispensed to any reaction well through any dispensing nozzle. Therefore, the number of reagents or chemical units which can be used simultaneously equals a number less than or equal to the number of dispensing nozzles present in the array. Various more frequently used reagents, (for example, A and B), can be connected to proportionally more nozzles than other less frequently used reagents, as desired. By having more than one nozzle in any column or row of nozzles dispensing the same frequently dispensed reagent, this reagent may simultaneously be dispensed into several different reaction wells positioned under the nozzle array, thus improving system flexibility.

In addition, having simultaneous independent movement in both the X and Y directions, different reagents can be quickly sequentially added into any particular reaction well and mixed during a single step in the chemical synthesis process. More particularly, at any step where chemical reagents are reacting in a reaction well, and the array of reaction wells are sitting stationary (i.e., not moving in an X-direction), a particular column or column of nozzles can be moved in a Y-direction so that various reagents can be quickly added to one or more of the reaction wells under this column(s) of nozzles. This Y-directional movement of the dispensing nozzles thus allows multiple reagent addition steps to be made into certain reaction wells concurrent with single reagent addition steps being made to other reaction wells. For example, a plurality of different chemical units and an activator could be added quickly to any single reaction well through various nozzles located along a Y-directional moving column of nozzles above this reaction well while the reaction well remains stationary. Furthermore, as these different columns of nozzles are independently moveable, they may each be moved at different speeds such that various reaction wells can receive the various reagents therein at different rates from other reaction wells, thereby allowing for different rates of chemical reactions occurring among these various reaction wells.

In the existing Brennan system, the number of columns required in the array must at least equal the number of reagents used in the synthesis because only one reagent was connected to a particular column of nozzles. A further advantage of the present invention, however, is that the number of reagents used can be greater than the number of columns in the array of nozzles by a factor equal to the number of rows in the array of nozzles, (FIG. 8B). Accordingly, the present system could easily be enabled to synthesize a very large number of chemical units without requiring a correspondingly large number of nozzle columns be provided.

Yet an additional advantage of the present invention is that as nozzles 22 move back and forth in the Y-direction, the number of nozzles actually dispensing reagents in each column could conceivably be less than the number of reaction wells in each column, as the Y-directional movement of the nozzle column would allow any of the individual nozzles to reach all the reaction wells. Accordingly, it is possible to construct a system having the ability to deliver various reagents to a large number of reaction wells, all without having to construct and setup a correspondingly large array of reagent dispensing nozzles.

Yet another important advantage of the present invention is that various reaction wells can each serve as different initial chemical compound starting-points for the reaction of various chemical compounds through the use of glass beads, as will be explained further herein. Accordingly, an increased number of chemical compounds can be synthesized by the present invention, as will be explained herein.

As was disclosed in U.S. Pat. No. 5,472,672 to Brennan, there are two important concerns in liquid reagent delivery through nozzles 22: 1) how to eject a droplet cleanly so that a drop is not left hanging on the end of the nozzle; and 2) how to keep the contents of the reaction chamber from splashing when the stream of reagent is delivered into the well. Further, the ejection velocity of the reagent from the nozzle must be significant to induce mixing between the first and second delivered reagent in the reaction chamber. Very small droplets can be ejected cleanly at high ejection velocities, but do not have sufficient kinetic energy to overcome the surface tension of the liquid already in the well to cause mixing. In contrast, larger droplets also eject cleanly at high ejection velocities, but tend to splash the contents into adjacent wells. At lower ejection velocities, the reagents tend to leave the last drop hanging from the nozzle tip, which is also a function of the cross-sectional area of the tip. Moreover, the flow rate of liquids through small capillary tubing varies directly with the delivery pressure and inversely with the length of the tube and inversely with the diameter. All these variables must be taken into consideration when developing delivery pressure and nozzle configurations, as well as the materials of construction, so that the reagents can be expelled cleanly without leaving a residual drop of liquid reagent hanging from the nozzle tip. Hence, depending on the liquid reagent, it may be more beneficial to dispense it in a continuous stream, a series of pulses or in droplet form. The present invention uses the same system with regard to cleanly ejecting droplets while preventing splashing as the existing Brennan system and consequently, this is not claimed as a novel feature of the present invention.

Similar to the existing Brennan system, each reagent reservoir 23, as shown in FIGS. 7A–7D, includes a pressure tube 53 coupled to a compressor device (not shown) which pressurizes reservoir air space 54 to drive the stored liquid reagent from the reservoir and through respective dispensing tubes 44. Delivery of reagents through dispensing tubes 44 is controlled by an array of independent valve assemblies 55 mounted in-line therewith. These valve assemblies are preferably provided by solenoid driven micro shutoff valves, each capable of opening and closing preferably in less than 5 milliseconds to deliver accurate volumes of liquid reagent.

To assure a constant delivery pressure across each dispensing tube 44, and hence, a constant delivery rate of liquid reagent through any nozzle 22, each dispensing tube will independently terminate in the liquid reagent contained in the reagent reservoir. Thus, independent of the number of nozzles set to deliver, this configuration will not suffer uneven rate delivery caused by varying line pressure.

In accordance with the present invention, base assembly 25 and head assembly 21 cooperate with longitudinal transport mechanism 27 for relative movement in the longitudinal X-direction between the base assembly and the head assembly to align the array of wells with the array of nozzles at a plurality of evenly spaced-apart positions in a longitudinal X-direction. Preferably, the longitudinal transport mechanism moves the base assembly along (phantom lines in FIG. 3) its longitudinal axis 35 such that the wells of each row 34 remain aligned with the nozzle columns 41. Base assembly 25 is, thus, slidably supported by frame assembly 57 (FIGS. 3 and 4) for reciprocating movement in the longitudinal X-direction of arrow 60. Sliding plate 33, carrying microtiter plate 32, is slidably received in a track mechanism 61 of frame assembly 57 for aligned movement in this longitudinal X-direction.

As is best seen in FIGS. 1 and 2, sliders 100 move a column 41 of nozzles 22 back and forth in incremental steps in a lateral Y-direction shown by arrow Y, such that each of nozzles 22 can be aligned with wells 26. Hence, by controlling the delivery of reagent through selected nozzles (via valve assemblies 55), and through manipulation of the transport mechanism in a longitudinal X-direction, and sliders 100 in a perpendicular lateral Y-direction, a plurality of sequence defined chemical reactions can be simultaneously carried out in selected wells in a rapid and reproducible manner.

Similar to the existing Brennan system, transport mechanism 27 includes a stepped motor assembly 62, schematically represented in FIG. 3, which is operably coupled to sliding plate 33. Hence, base assembly 25 cooperates with track mechanism 61 and the stepped motor for linear incremental movement in a longitudinal X-direction to align the array of wells with the array of nozzles at a plurality of positions. It will be understood, however, that the transport mechanism can be provided by any motor/track configuration which moves the base assembly relative to the head assembly in this longitudinal X-direction.

Before chemical synthesis begins or after the synthesis process or steps within the synthesis process have ended, the array of wells may be positioned by moving the wells 26 (via movement of base assembly 25) to the extreme right or left of sliding seal 30 outside of common chamber 31 and exposed to the open environment for operator access. Hence, the well array may be cleaned or loaded with solid support material or glass beads, to be discussed. Further, the wells and nozzles, while inside the common chamber, may be accessed through a hinge assembly 63, as shown in FIG. 4, which pivotally mounts head assembly 21 to frame assembly 57 and opens the common chamber. This access feature allows for supports, typically glass beads, to be added to or removed from any particular reaction well and be transferred into any other reaction well. As a plurality of different glass beads can be simultaneously contained within any single reaction well, the true combinatorial synthesis potential of the present invention becomes apparent when these glass beads are transferred among the various reaction wells between reaction steps as will be detailed herein.

Referring now to FIGS. 1, 3 and 5, sliding seal 30 is disposed between the bottom surface 51 of head assembly 21 and the top surface 52 of base assembly 25 to environmentally contain both the reaction wells and the nozzles in a common chamber 31. Similarly, sliding seals 120 are disposed between the bottom surface 125 of sliders 100 and the top surface 130 of head assembly 21. Further, as will be described in greater detail below, by streaming an inert gas through common chamber 31 to maintain an inert environment and sweep any air and water fumes or traces from the chamber, hydrolysis and oxidation can be minimized, if not eliminated, as desired.

Sliding seals 30 and 120 must be formed to maintain environmental containment while permitting the base assembly to slide relative the head assembly. In the preferred form, sliding seals 30 and 120 are provided by an elastic, rectangular-shaped, hydrofoil or balloon seal gasket, in the case of seal 30, having an upper end mounted to head bottom surface 51 and an opposite or lower end 64 in sliding contact with base top surface 52, and in the case of sliding seal 120, and to bottom surface 125 of sliders 100 and to top surface 130 of head assembly 21, respectively. These special gaskets preferably are composed of a rubber-backed gasket coated with TEFLON® or the like, increase seal integrity between gasket lower end 64 and base top surface 52 and between bottom surface 125 and top surface 130 as the pressure in common chamber increases. FIG. 5 illustrates that gasket lower end 64 of sliding seal 30 peripherally tapers inwardly toward an interior of common chamber 31. Upon increase in chamber pressure, the walls of gasket seal 30 and 120 expand outwardly whereby the surface area contact between the gasket lower ends and the top surfaces increases for better sealing engagement therebetween.

To facilitate sliding contact, while maintaining environmental containment, basket seals 30 and 120 include a stick-free coating or layer 65 (FIG. 5), preferably TEFLON®, between the gasket lower end and the base top surface. This layer further serves the purpose of protecting the sealing gasket from surface absorption of residual liquid reagents which tend to deteriorate the gasket upon contact, due in part to the elastic nature thereof. As shown in FIG. 5, top surface 52 of the base assembly 25 and top surface 130 of head assembly 21 may also include a coating or layer 66 of TEFLON® to promote sliding contact and for protection of the top surface from residual reagent.

It will be understood that the seal between gasket lower end 64 and base top surface 52 and between bottom surface 125 and top surface 130 need not be hermetic. The primary function of the seal gasket is to exclude oxygen from the reaction chamber. Thus, it is important to normally maintain a minimum positive pressure inside common chamber 31 at all times during synthesis which is slightly greater than atmospheric pressure so that the flow of gas, should a leak occur, would be outward. This minimum positive pressure differential is generally about 1/100 psi to about 1/2 psi.

Similar to the existing Brennan system, as previously indicated and as viewed in FIGS. 3, 5 and 6, it is desirable to flush the air and water traces from the reaction head space of the chamber with an inert gas, preferably argon, to minimize hydrolysis and oxidation of any sensitive chemicals used during synthesis. It is further desirable when using these various sensitive chemical compounds to continuously stream the inert gas through the head space to protect the chemicals used from other reagents, for example an aqueous iodine vapor or trichloroacetic acid, which will degrade the inert environment. This is accomplished by introducing a flow of inert gas (represented by arrows 67) through common chamber 31 from a gas inlet 70, positioned upstream from the array of nozzles 22, which exits the chamber through a gas outlet 71 positioned downstream from the nozzles. Gas inlet 70 is coupled to a gas source (not shown) through inlet tube 72 (FIG. 1) which further provides the positive pressure inside common chamber 31 necessary to exclude the oxygen from the environment. Since the head space of the common chamber is relatively small (exaggerated in the FIGURES for illustration), a sufficient flow of gas past the nozzles can be fashioned to sweep or flush the chamber of fumes without expending large volumes of gas.

The gas inlet is preferably provided by an elongated inlet slot 70 (FIG. 2) extending into head plate 47 and aligned transverse to the longitudinal axis 42 of heat plate 47. This shape and orientation induces a substantially laminar flow of inert gas from upstream inlet 70 to downstream outlet 71 which minimizes cross flow of gas across the nozzles and sweeps the dead zones of stagnant reagent vapors from the chamber. It will be noted that the gas inlet may also be provided by a series of apertures extending transversely across head plate 47, and that gas outlet 71 may further be provided by an elongated slot or series of apertures.

Because of the gas flow through the chamber when synthesizing, the acid and moisture sensitive reagents are positioned upstream from the non-sensitive reagents, forming a diffusion gas barrier, which maximizes the sweeping effect. Accordingly, in FIG. 3, the sensitive reagents would be dispensed from nozzles 22 closer to gas inlet 70, while the non-sensitive reagents would be dispensed from the nozzles situated closer to gas outlet 71, downstream from the sensitive reagent dispensing nozzles.

Also similar to the Brennan system, in another aspect of the present invention, as best viewed in FIGS. 5 and 6, chemical synthesis apparatus 20 is provided with reaction wells 26 having at least one orifice, generally designated 74, extending into the well. At least one solid support 75 is disposed in the well for synthesizing and immobilizing a chemical compound thereon. Reagent solution 76 in well 26 is in contact with the solid support 75 and at least one chemical unit of the chemical compound affixed to the solid support. Orifice 74 has an entrance 77 into well 26 from the common chamber side and an exit 80 out of the well into a lower catch basin 81 below. Importantly, the orifice is of a size and dimension to form a capillary liquid seal with reagent solution 76 contained therein to retain the reagent solution in the well enabling chemical compound synthesis therein. To further retain solution 76 in wells 26, a pressure differential between a common chamber gas pressure exerted on the reagent solution in reaction wells 26 and a second gas pressure exerted on orifice exits 80 (illustrated by arrows 79 in FIG. 6) must be less than a predetermined amount. Finally, a pressure regulating device 82 is provided for controlling the pressure differential such that upon the pressure differential exceeding the predetermined amount, the reagent solution 76 is expelled from well 26 through orifice 74 (FIG. 5).

Briefly, after proper alignment between selected wells 26' with selected nozzles 22' (FIG. 6), using the array technique and novel apparatus above-mentioned, the liquid reagents can be deposited into selected wells 26'. The deposited reagent solutions collects across the correctly dimensioned orifice 74, in combination with a relatively small pressure differential (not greater than the predetermined amount), to form a meniscus across orifice 74 and crating a capillary liquid seal to retain the solution in the well without draining through the orifice. This seal effectively separates the common reaction chamber from the environment of lower catch basin 81 below. After a sufficient amount of time has passed to complete the synthesis reaction, the reagent solution is purged from well 26 through orifice 74 and into lower catch basin 81 by increasing the gas pressure differential above the predetermined amount which overcomes the capillary forces in the orifice (FIG. 5). Subsequently, the purged reagent solutions may be drawn out of the catch basin through a drain outlet 83. This process is repeated for each synthesis step until the desired defined chemical compound is fabricated.

A retaining device, generally designated 84, is included positioned in the bottom of well 26 between orifice 74 and the solid support 75 which is formed and dimensioned to substantially prevent passage of the solid support through the orifice. Retaining device 84 is preferably provided by a polyethylene or glass fiber frit which acts as a filter membrane permitting the reagent solution to flow therethrough while retaining the solid support and chemical compound synthesized thereon in the well. Hence, the porosity of the frit is also a factor in the formation of the capillary liquid seal and in the determination of the pressure differential necessary to purge the reaction well.

To regulate and control pressure differential between common chamber 31 and lower catch basin 81, as mentioned, pressure regulating device 82 is provided operably coupled therebetween. In the preferred embodiment, pressure regulating device 82 is integrated with the gas flow assembly employed to flush the head space in common chamber 31 of reagent toxins. Upon the inert gas freely sweeping the chamber from gas inlet 70 to gas outlet 71, the minimum pressure differential is generally retained between about 1/100 psi to about 1 psi, but preferably between 1/100 psi and 1/10 psi. This pressure differential which is sufficiently positive to prevent seepage of environmental air into the common chamber, while being insufficient to overcome the capillary forces of the capillary liquid seal in each well. By preventing or restricting the outflow of inert gas through gas outlet 71, the pressure inside chamber 31 can be increased, thereby increasing the pressure differential to purge the wells (FIG. 5) if the catch basin pressure is not increased at the same or greater rate. Alternatively, the bottom of each well could be valved.

The pressure regulating device 82, hence, includes a chamber valve 85 (FIG. 1) coupled to gas outlet 71 for controlling the outflow of inert gas sweeping common chamber 31. Accordingly, by sufficiently closing or restricting flow through chamber valve 85, the pressure differential can be raised above the predetermined amount so that the wells can be purged of reagent solution simultaneously. Similarly, by sufficiently opening chamber valve 85, the pressure differential may be lowered below the predetermined amount when it is desired to retain the deposited liquid solution in the selected wells.

The liquid reaction solution will leak only slowly or will not leak out of or be purged from well orifice 74 until there is a sufficient head of liquid in the well or a sufficient gas pressure differential between the common chamber and the lower catch basin to overcome the capillary forces in the orifice. The rate of gravity-driven and pressure-driven leakage from the orifice is primarily governed by the viscosity of the solvent, the porosity of the frit, and the size of the orifice, and the gas pressure differential. For instance, a $10\mu$ UHMW polyethylene frit and a 0.015 $in^2$ orifice will support at least 0.79 in. liquid head of acetonitrile (having a viscosity of about 0.345 centipoise ($7.2\times10^{-5}$ (lbf-s)/$ft^2$ at an operating temperature of about 68° F.)) before beginning to overcome the capillary forces in the orifice. On the other hand, by increasing the pressure differential above the predetermined amount (generally about 1 psi) to about 5 psi, purging of the well will occur rapidly. In practice, it is necessary to maintain a pressure differential between about 2.5 psi to about 5 psi to sufficiently purge the reaction wells simultaneously of reagent solution. As the individual wells begin to empty, the flow rate of inert gas through the empty wells of the microtiter plate substantially increases which decreases the pressure in common chamber 31. Accordingly, this decrease in interior pressure further decreases the purging or draining rate of the reagent solution through the orifices, an effect magnified by retaining filter membrane 84.

It will be appreciated that the pressure differential may also be created by forming a vacuum in lower catch basin 81 to purge the reaction wells. FIG. 1 illustrates that an access opening 86 into lower catch basin 81 may be sealed by a cover 87, and drain outlet 83 may be coupled to a vacuum pump which creates a vacuum in the basin. The pressure differential may also be created from a combination of positive pressure in common chamber 31 and a vacuum in catch basin 81. Further, since the reagent solution is allowed to collect in the reaction well for reaction thereof rather than continuously streaming through the chamber, as is employed by some other prior art assemblies, reagent consumption is substantially minimized thereby saving costs. Labor costs are also reduced by minimizing each cycle time.

To coordinate all the simultaneous functions, a control mechanism 90 (FIG. 7) is operably coupled between transport mechanism 27, valve assemblies 55 and pressure regulating device 82.

As was seen in the existing Brennan system, directed to polymer chain synthesis, a file can be input which contains an ordered list of well position, scale, reagent use and sequence of addition for each well. This file cooperates with a command file used to indicate the actual number and order of chemical synthesis steps and the length of time for Wait and pressure and/or vacuum Drain steps which define the complete coupling step.

Chemical compounds are typically synthesized on solid supports made of controlled pored glass (CPG) beads, tentagel®, polystyrene or other inert solid support materials. Hence, upon preparation for chemical synthesis, each well is individually loaded with the correct solid support. However, individually weighing and transferring 0.5 mg quantities of the appropriate dry support to each well can be tedious and time consuming.

In accordance with the present invention, a balanced density slurry technique can be employed to deposit the correct amount of solid support into a reaction well. By suspending the solid support in a suspension solution, a desired amount of solid support can be accurately deposited in a well by pipetting, either automatically or manually, a corresponding volume of suspension solution therein. For example, a non-settling 10%→1% weight/volume suspension of CPG can be prepared in a 2.5:1 volume/volume dibromomethane-dichloromethane solution. Subsequently, the CPG can be washed and purged of suspension solution before synthesis using the technique mentioned above. Such slurries can also be used by a variety of solid supports such as Argo Gel™, Argonaught Technologies of Palo Alto and Tenta gel™, Rapp Polymer of Germany.

The true potential for advanced chemical combinatorial synthesis is best achieved through the use of beads which are large enough to be individually handled, yet small enough such that a plurality of these glass beads can be placed in each reaction well. Preferably, these beads may also be marked by chemical tags so as to be individually identifiable (e.g., by the method of Clark Still at Columbia University). These glass beads can later be removed from, and transferred among, the reaction wells as desired for reasons detailed below.

In a first step of a series of chemical reaction steps, a plurality of glass beads resting in any single reaction well can be reacted with a particular single reagent dispersed from a single nozzle above this reaction well. These beads can then be transferred into a plurality of other reaction wells, as desired, such that different reagents, dispensed into each of these different reaction wells through various other dispensing nozzles can then be reacted with these glass beads. By transferring a number of glass beads from a first reaction well into many different reaction wells between the various steps in a chemical reaction process, the number of combinations and the complexity of these different chemical compounds which can be simultaneously synthesized in the array of reaction wells can be increased dramatically. As each reaction well can contain a plurality of these glass beads having various chemical compounds synthesized thereon, and these glass beads can variously be: (1) transferred singly between various reaction wells, (2) taken from one reaction well and spread into various other reaction wells, or (3) taken from various reaction wells and placed into a single reaction well, a system for very complex and very flexible combinatorial synthesis is provided.

In another aspect of the present invention, a method of synthesis of a chemical compound is provided comprising the steps of: A) aligning reaction well 26 and a selected one nozzle 22 of synthesis apparatus 20 through transport mechanism 27 coupled to at least one of head assembly 21 and base assembly 25 to produce relative movement therebetween in a longitudinal X-direction; and B) aligning said reaction well and a selected one nozzle in a longitudinal Y-direction through a movable slider holding said selected one nozzle, and coupled to said head assembly to produce relative motion between said slider and said head assembly; C) depositing a chemical unit such as liquid reagent 24 into well 26 from reagent reservoir 23 through the one nozzle to enable synthesis of a chemical compound. Finally, D) purging gaseous fumes or reaction by-products emitted by the reagents, from common chamber 31 through passage of a gas from a pressurized gas source, coupled to an inlet 70 into common chamber 31 and positioned upstream from the nozzle, and out of the chamber through an outlet 71 out from the common chamber and positioned downstream from the nozzle.

In another method, steps "A, B and C" of the above method can be repeated a number of times before the carrying out of step "D" such that a plurality of different chemical reagents 24 can be deposited into any well 26 to enable simultaneous reaction of these various reagents.

Another method of chemical compound synthesis is provided for building a chemical compound by sequentially adding chemical units to at least one solid support for synthesizing and immobilizing a chemical compound thereon in a liquid reagent. The method comprises the steps of A) depositing liquid reagent 24 in reaction well 26, having a properly sized orifice 74, in contact with at least one solid support 75 and at least one chemical unit of the chemical compound affixed to solid support 75, and forming a capillary liquid seal to retain the reagent solution in well 26 to enable chemical compound synthesis on solid support 75. The next step includes B) applying a first gas pressure to reaction chamber 31 such that a pressure differential between the first gas pressure and a second gas pressure exerted on an exit 80 of orifice 74 exceeds a predetermined amount necessary to overcome the capillary liquid seal and expel the reagent solution from well 26 through orifice 74.

By repeating the steps of the three above-mentioned methods, chemical compounds can be synthesized from various chemical units, which are in turn made up of various chemical units and sub-units.

EXAMPLES

Example 1

Synthesis of a Small Molecule Library

A small molecular library of single compounds having the general structure I, as depicted in the Figures, was prepared from the appropriately functionalized resin using the methods described in PCT/US96/09604, hereby incorporated by reference in its entirety.

An analysis of three selected individual wells containing compounds having the structures II, III and IV, depicted in FIG. 9, was preformed, and the results are detailed in Table I, below. The results indicate that the expected products were produced in >90% purity.

TABLE I

| Plate | Well | Structure | HPLC (260 nm)[a] | Mass expected/observed |
|---|---|---|---|---|
| 9/12/96 | B7 | II | [3]95% | 527.0 |
| 9/12/96 | B10 | III | [3]90% | 597.0 |
| 9/12/96 | F3 | IV | [3]90% | 576.0 |

[a]HPLC conditions: 4.6 × 250 cm (C18 (Rainin); gradient of acetonitrile in 0.1 M ammonium acetate, pH 6.5; 1 to 75% acetonitrile over 45 minutes, flow rate 1 ml/minute; detection by UV absorbance at 260 nm and 220 nm.
[b]Electrospray mass spectrometry in positive mode.

TABLE II

| Plate | Well | Compound Structure | | | | Mass expected/observed |
|---|---|---|---|---|---|---|
| | | S1-R1 | S2 | RL2 | R2 | |
| Pil_9 | A4 | SE-IB | PD | CP | BN | 469 |
| | | DEA-IB | PD | CP | BN | 483 |
| | | HP-IB | PD | CP | BN | 495 |
| | | BHP-IB | PD | CP | BN | 509 |
| | | SE-NZ | PD | CP | BN | 580 |
| | | DEA-NZ | PD | CP | BN | 594 |
| | | HP-NZ | PD | CP | BN | 606 |
| | | BHP-NZ | PD | CP | BN | 620 |
| Pil_10 | C3 | SE-IB | HP | ME | PRE | 466 |
| | | DEA-IB | HP | ME | PRE | 480 |
| | | HP-IB | HP | ME | PRE | 492 |
| | | BHP-IB | HP | ME | PRE | 506 |
| | | SE-NZ | HP | ME | PRE | 577 |
| | | DEA-NZ | HP | ME | PRE | 591 |
| | | HP-NZ | HP | ME | PRE | 603 |
| | | BHP-NZ | HP | ME | PRE | 617 |
| Pil_12 | E8 | SE-TF | BHP | BS | BNN | 692 |
| | | DEA-PH | BHP | BS | BNN | 700 |
| | | HP-TF | BHP | BS | BNN | 706 |
| | | BHP-PH | BHP | BS | BNN | 714 |
| | | SE-TF | BHP | BS | BNN | 718 |
| | | DEA-PH | BHP | BS | BNN | 726 |
| | | HP-TF | BHP | BS | BNN | 732 |
| | | BHP-PH | BHP | BS | BNN | 740 |

What is claimed is:

1. A chemical synthesis apparatus for building chemical compounds by sequentially adding chemical units in a liquid reagent, said apparatus comprising:
   a frame assembly;
   a base assembly movably mounted to said frame assembly for movement in a first direction and including an array of reaction wells aligned in a plurality of spaced-apart reaction well rows and reaction well columns, each reaction well having at least one respective upper orifice extending into said well;
   a head assembly mounted to said frame assembly and having an array of nozzles aligned in a plurality of nozzle rows and nozzle columns spaced apart by a distance substantially similar to the spacing between said well rows and well columns for alignment therebetween, each nozzle being coupled to a different reservoir of liquid reagent for controlled delivery therethrough; said nozzle columns being independently movable in a second direction perpendicular to the first direction; and
   a plurality of seals positioned between said head assembly and said nozzle columns to form a seal therebetween;
   whereby repositioning of a nozzle column in the second direction allows delivery of any liquid reagent from the reservoirs coupled to the nozzle columns to any of the rows of reaction wells and movement of the base assembly in the first direction allows delivery of any liquid reagent to any of the reaction wells in a column of reaction wells.

2. The chemical synthesis apparatus as defined in claim 1 wherein,
   said base assembly moves relative said head assembly along a path substantially perpendicular to said nozzle columns to position at least one well column in depository alignment with at least one of said nozzles in a selected nozzle column for simultaneous deposition of a liquid reagent into selected reaction wells for synthesis of chemical compounds.

3. The chemical synthesis apparatus as defined in claim 1 wherein,
   said nozzle columns move independently relative to said base assembly, along a path substantially parallel to said reaction well columns for moving said nozzle columns to position at least one nozzle column for deposition of a liquid reagent into at least one of said reaction wells for synthesis of chemical compounds.

4. The chemical synthesis apparatus as defined in claim 1 further comprising:
   a transport mechanism coupled to said base assembly for moving said head assembly, along a path substantially perpendicular to said nozzle columns to position at least one well column of reaction wells in depository alignment with at least one of said nozzles in a selected nozzle column for simultaneous deposition of a liquid reagent into at least one selected reaction well for synthesis of at least one chemical compound, and
   a plurality of independently controlled sliders for individual moving support of the nozzle columns along a path substantially parallel to said reaction well columns for moving said nozzle columns to position at least one nozzle of said nozzle columns for deposition of a liquid reagent into at least one of said selected reaction wells for synthesis of chemical compounds.

5. The chemical synthesis apparatus as defined in claim 4 further comprising:
   a first sliding seal positioned between said head assembly and said base assembly, and enclosing all said reaction wells and all said nozzles therein to seal a common chamber; and
   a plurality of second sliding seals positioned between said head assembly and said sliders, and enclosing all said reaction wells and all said nozzles therein to seal a common chamber;
   each said well additionally having a lower orifice being of a size and dimension to form a capillary liquid seal to retain said deposited liquid reagent in said selected wells to enable chemical compound synthesis therein when a pressure differential between a first gas pressure in said common chamber and a second gas pressure exerted on each lower orifice is less than a predetermined amount; and
   a pressure regulating device for controlling said pressure differential such that upon said pressure differential exceeding said predetermined amount, said liquid reagent being expelled from respective wells through the respective lower orifices.

6. The chemical synthesis apparatus as defined in claim 5 wherein,
   said first sliding seal is provided by a balloon seal having one end affixed to a bottom surface of said head assembly, and an opposite end in sliding contact with a top surface of said base assembly.

7. The chemical synthesis apparatus as defined in claim 5 wherein, said plurality of second sliding seals are provided by a plurality of balloon seals each having one end affixed to a bottom surface of said sliders and an opposite end in sliding contact with a top surface of said head assembly.

8. The chemical synthesis apparatus as defined in claim 4 wherein, said transport mechanism includes a stepped motor operably coupled to said base assembly for linear incremental movement of said reactions wells along said path.

9. The chemical synthesis apparatus as defined in claim 7 wherein, each balloon seal increases its seal integrity as the pressure in the common chamber increases.

10. The chemical synthesis apparatus as defined in claim 1 wherein, any nozzle in said array of nozzles is positionable in direct depository alignment over any row of reaction wells.

11. The chemical synthesis apparatus as defined in claim 9 wherein, each nozzle communicates with a reagent reservoir through a tube forming a passageway and having one end coupled to said nozzle and an opposite end terminating in said reagent reservoir, sand each tube includes a valve assembly in-line with said passageway to control passage of the reagent solution therethrough.

12. The chemical synthesis apparatus as defined in claim 5 wherein, said pressure regulating device includes an inlet into said common chamber positioned upstream from said array of nozzles, an outlet out of said common chamber positioned downstream from said array of nozzles, and a pressurized gas source coupled to said inlet for continuously streaming a gas from said gas source through said common chamber from said inlet to said outlet to sweep said common chamber of fumes emitted by said reagents.

13. The chemical synthesis apparatus as defined in claim 12 wherein, said pressure regulating device further includes a chamber valve coupled to said outlet controlling outflow of said gas from said chamber for one of raising said pressure differential above said predetermined amount and lowering said pressure differential below said predetermined amount.

14. A chemical synthesis apparatus for building chemical compounds by sequentially adding chemical units in a liquid reagent, said apparatus comprising:

a head assembly having an array of nozzles comprising nozzle rows and nozzle columns, mounted thereto in generally spaced-apart relation, all nozzles being coupled to a different reservoir of liquid reagent for controlled delivery therethrough, said nozzle columns being independently movable, sliders for individual moving support of said nozzle columns;

a base assembly having a plurality of reaction wells and including an upper orifice extending into each reaction well, each said reaction well additionally having a lower orifice being of size and dimension to form a capillary liquid seal to retain deposited liquids in said reaction well, the base assembly and the head assembly being movable relative to one another in a first direction, the nozzle columns being movable in a second, perpendicular direction, the relative movement of the head assembly and the base assembly and the movement of the nozzle columns allowing delivery of any liquid reagent to any reaction well, and a plurality of seals positioned between said head assembly and said nozzle columns to form a seal therebetween.

15. The chemical synthesis apparatus as defined in claim 14 further comprising:

a transport mechanism coupled to at least one of said base assembly and said head assembly to produce relative movement therebetween to position a reaction well and a selected nozzle in alignment for deposition of a liquid reagent into said reaction well for synthesis of a chemical compound; and a plurality of independently controllable sliders for individual moving support of the nozzle columns, relative to said head assembly, along a path substantially parallel to said nozzle columns for moving said nozzle columns to position at least one nozzle of a nozzle column for deposition of a liquid reagent into at least one reaction well for synthesis of one or more chemical compounds.

16. The chemical synthesis apparatus as defined in claim 14 further comprising:

a pressure regulating device for controlling the pressure differential from said upper orifice to said lower orifice of said reaction well such that upon said pressure differential exceeding said predetermined amount, said reagent solution being expelled from said reaction well through said lower orifice of said reaction wells.

17. The chemical synthesis apparatus as defined in claim 14 further comprising:

a first sliding seal positioned between said head assembly and said base assembly, and enclosing all upper orifices of said reaction wells and all said nozzles therein to seal a common chamber; and a plurality of second sliding seals positioned between said head assembly and said sliders, and enclosing all said reaction wells and all said nozzles therein to seal said common chamber.

18. A chemical synthesis apparatus for building chemical compounds as defined in claim 17, wherein said second sliding seals are balloon seals that increase their seal integrity as the pressure in the common chamber increases.

19. The chemical synthesis apparatus as defined in claim 16 wherein, said pressure regulating device includes an inlet into said common chamber positioned upstream from said nozzles, and an outlet out of said common chamber positioned downstream from said nozzles, and a pressurized gas source coupled to said inlet for continuously streaming a gas from said gas source through said common chamber from said inlet to said outlet to sweep said chamber of fumes emitted by said reagents.

20. The chemical synthesis apparatus as defined in claim 19 wherein, said pressure regulating device further includes a chamber valve coupled to said outlet controlling outflow of said gas from said common chamber for one of raising said pressure differential above said predetermined amount and lowering said pressure differential below said predetermined amount.

21. The chemical synthesis apparatus as defined in claim 19 wherein,
said inlet and said outlet are part of said head assembly.

22. The chemical synthesis apparatus as defined in claim 16 wherein,
said base assembly includes a top surface defining said upper orifice of said wells, and an opposite facing bottom surface, each said lower orifice extending from said bottom surface toward said top surface and into a reaction well, and said synthesis apparatus further including:
a bottom chamber mechanism cooperating with said base bottom surface to form a bottom chamber enclosing each said lower orifice therein, said pressure regulating device communicating with said bottom chamber to form a vacuum for regulation of said pressure differential from said top surface to said bottom surface.

23. The chemical synthesis apparatus as defined in claim 14 wherein,
any nozzle in said array of nozzles is positionable in direct depository alignment over any reaction well in said array of reaction wells.

24. A chemical synthesis apparatus for building a chemical compound by sequentially adding chemical units in a reagent solution, said apparatus comprising:
a base assembly defining a plurality of reaction wells aligned in an array of spaced-apart reaction well rows and reaction well columns;
a head assembly having an array of nozzles aligned in a plurality of nozzle rows and nozzle columns, spaced apart by a distance substantially similar to the spacing between said reaction well rows and reaction well columns for alignment therebetween, said nozzle columns being independently movable to reposition their nozzles over different rows of reaction wells, each nozzle being coupled to one reservoir of a plurality of independent reagent reservoirs each including a different liquid reagent for selective, sequential and controlled delivery to and reaction well in a predetermined manner through a respective nozzle, and a plurality of sliders for individual moving support of said nozzle columns,
the head assembly and base assembly being relatively movable so that each nozzle can be aligned with any reaction well, and
a plurality of seals positioned between said head assembly and said nozzle columns to form a seal therebetween.

25. The chemical synthesis apparatus as defined in claim 24 further comprising:
a transport mechanism coupled to at least one of said head assembly and said base assembly to produce relative movement substantially perpendicular to said nozzle columns to align any one selected nozzle with any one reaction well for deposition of a liquid reagent into said one reaction well for synthesis of a chemical compound using any of the liquid reagents.

26. The chemical synthesis apparatus as defined in claim 24 wherein:
the sliders are coupled to said nozzle columns for movement substantially perpendicular to said reaction well rows to align any one selected nozzle with any one reaction well for deposition of a liquid reagent into said one reaction well for synthesis of a chemical compound.

27. The chemical synthesis apparatus as defined in claim 24 further comprising:
a first sliding seal positioned between said head assembly and said base assembly, and enclosing all said reaction wells and all said nozzles therein to seal a common chamber;
a plurality of second sliding seals positioned between said head assembly and said sliders, and enclosing all said reaction wells and all said nozzles therein to seal said common chamber; and
each reaction well including at least one respective orifice extending into a respective well, each orifice having an entrance into said well and an exit, said exit being of a size and dimension to form a capillary liquid seal to retain the deposited liquid reagent in selected wells to enable chemical compound synthesis therein when a pressure differential between a first gas pressure in said chamber and a second gas pressure exerted at each orifice exit is less than a predetermined amount.

28. The chemical synthesis apparatus as defined in claim 24 wherein,
any nozzle in said array of nozzles is positionable in direct depository alignment over any reaction well.

29. The chemical synthesis apparatus as defined in claim 27 further including,
a pressure regulating device for controlling said pressure differential such that upon said pressure differential exceeding said predetermined amount, said reagent solution is expelled from said well through the exit of said orifice.

30. The chemical synthesis apparatus as defined in claim 29 wherein,
said pressure regulating device includes an inlet into said common chamber positioned upstream from said array of nozzles, an outlet out of said common chamber positioned downstream from said array of nozzles, and
a pressure gas source coupled to said inlet for continuously streaming a gas from said gas source through said common chamber from said chamber inlet to said chamber outlet and out said outlet to sweep said chamber of fumes emitted by said reagents.

31. The chemical synthesis apparatus as defined in claim 30 wherein,
said pressure regulating device further includes a chamber valve coupled to said outlet controlling outflow of said gas from said chamber for one of raising said pressure differential above said predetermined amount and lowering said pressure differential below said predetermined amount.

32. The chemical synthesis apparatus as defined in claim 31 wherein,
said inlet and said outlet are defined by said head assembly.

33. The chemical synthesis apparatus as defined in claim 32 wherein,
said inlet is provided by an inlet slot extending substantially transversely across said common chamber such that said continuous stream is substantially laminar during passage by said array of nozzles.

34. The chemical synthesis apparatus as defined in claim 27 wherein,
said second sliding seals are balloon seals that increase their seal integrity as pressure in the common chamber increases.

35. A chemical synthesis apparatus for building chemical compounds by sequentially adding chemical units in a liquid reagent, said apparatus comprising:

a head assembly having a substantially planar bottom surface and an array of nozzles comprising nozzle rows and nozzle columns, mounted thereto in generally spaced-apart relation, said nozzle columns being independently movable, all nozzles being coupled to a different reservoir of liquid reagent, and having a nozzle tip portion formed and dimensioned for controlled droplet formation and delivery in a substantially vertical direction therethrough;

a base assembly having a plurality of reaction wells, the base assembly and head assembly being relatively movable to reposition columns of nozzles over different reaction wells, and a plurality of seals positioned between said head assembly and said nozzle columns to form a seal therebetween.

36. The chemical synthesis apparatus as defined in claim 35 further comprising:

a transport mechanism coupled to at least one of said base assembly and said head assembly to produce relative movement therebetween to position a reaction well and a selected one nozzle in alignment for deposition of a liquid reagent into said reaction wells for synthesis of a chemical compound; and a plurality of independently controllable sliders for individual moving support, relative said head assembly, along a path substantially parallel to said nozzle columns for moving said nozzle columns to position at least one nozzle of said nozzle columns for deposition of a liquid reagent into at least one of said reaction wells for synthesis of chemical compounds.

37. The chemical synthesis apparatus as defined in claim 35 further comprising:

a first sliding seal positioned between said head assembly bottom surface and said base assembly to form a common chamber for enclosing both said reaction wells and said nozzles therein;

sliders for individual moving support of said nozzle columns; and a plurality of second sliding seals positioned between said head assembly and said sliders to form a common chamber for enclosing both said reaction well and said nozzles therein.

38. The chemical synthesis apparatus as defined in claim 35 wherein, any nozzle in said array of moveable nozzles is positionable in direct depository alignment over any reaction well.

39. The chemical synthesis apparatus as defined in claim 37 wherein, said second sliding seals are balloon seals that increase their seal integrity as pressure increases in the common chamber.

40. The chemical synthesis apparatus as defined in claim 37 wherein, each said nozzle tip portion extends past the bottom surface of said head assembly partially defining said common chamber, and terminates at a position such that said nozzle tip portion is free of contact with said head assembly to substantially prevent contact of said liquid reagent with said head assembly during said droplet formation and delivery, the distal end of each nozzle is positioned proximate the substantially planar bottom surface of said head assembly, and said base assembly includes a substantially planar top surface in opposed relation to said head assembly bottom surface, and said first sliding seal is provided by a balloon seal having one end affixed to one of said head assembly bottom surface and said base assembly top surface, and an opposite end in sliding contact with the other of said base assembly top surface and said head assembly bottom surface.

41. The chemical synthesis apparatus as defined in claim 40 wherein, said opposite end tapers radially inwardly toward an interior portion of said chamber in a manner such that upon increase in pressure in said chamber, the balloon seal integrity between said opposite end and the other of said base assembly top surface and said head assembly bottom surface increases.

42. The chemical synthesis apparatus as defined in claim 41 wherein, said balloon seal of one end is mounted to said base assembly bottom surface, and said seal opposite end is in sliding contact with said base assembly top surface.

43. The chemical synthesis apparatus as defined in claim 40 wherein, said opposite end includes a substantially stick-free coating or layer in sliding contact with the other of said base assembly top surface and said head assembly bottom surface.

44. The chemical synthesis apparatus as defined in claim 43 wherein, said coating or layer comprises polyfluoroolefin resin.

45. The chemical synthesis apparatus as defined in claim 40 wherein, the other of said base assembly top surface and said head assembly bottom surface is in sliding contact with said opposite end including a substantially stick-free coating or layer therebetween.

46. The chemical synthesis apparatus as defined in claim 45 wherein, said coating or layer comprises polyfluoroolefin resin.

47. The chemical synthesis apparatus as defined in claim 39 wherein, the bottom surface of said head assembly includes at least one slot defined by said lower surface upon which each said nozzles tip portions terminate and extend into.

48. The chemical synthesis apparatus as defined in claim 36 wherein, said transport mechanism includes a stepped motor operably coupled to one of the head assembly and the base assembly for incremental movement thereof.

49. The chemical synthesis apparatus as defined in claim 36 wherein, said transport mechanism is operably coupled to said base assembly for movement thereof.

50. The chemical synthesis apparatus as defined in claim 49 wherein, said transport mechanism includes a stepped motor operably coupled to the base assembly for incremental substantially linear movement relative said nozzles.

51. The chemical synthesis apparatus as defined in claim 37 wherein, each well having an entrance into said well and an exit, said exit being a lower orifice of a size and dimension to form a capillary liquid seal to retain said liquid reagent in said well to enable chemical compound synthesis therein when a pressure differential between a first gas pressure in said common chamber and a second gas pressure exerted on said exit is less than a predetermined amount.

52. The chemical synthesis apparatus as defined in claim 51, further including,
a pressure regulating device for controlling said pressure differential such that upon said pressure differential exceeding said predetermined amount, said reagent solution is expelled from said well through said exit.

53. The chemical synthesis apparatus as defined in claim 52 wherein,
at least one solid support disposed in said well for synthesizing and immobilizing said chemical compound thereon;
said liquid reagent in said well in contact with said solid support and at least one chemical unit of said chemical compound affixed to said solid support; and
a retainer assembly positioned in said well, and formed and dimensioned to substantially prevent passage of solid support through said orifice.

54. The chemical synthesis apparatus as defined in claim 53 wherein,
said retainer assembly comprises a filter member disposed in said well between said one orifice and said solid support.

55. The chemical synthesis apparatus as defined in claim 52 wherein,
said pressure regulating device includes an inlet into said common chamber positioned upstream from said nozzles, an outlet out of said common chamber positioned downstream from said nozzles, and a pressurized gas source coupled to said inlet for continuously streaming a gas from said inlet to said outlet to sweep said chamber of fumes emitted by said reagents.

56. The chemical synthesis apparatus as defined in claim 55 wherein,
said pressure regulating device further includes a chamber valve coupled to said outlet controlling outflow of said gas from said chamber for one of raising said pressure differential above said predetermined amount and lowering said pressure differential below said predetermined amount.

57. The chemical synthesis apparatus as defined in claim 55 wherein,
said inlet and said outlet are defined by said head assembly.

58. The chemical synthesis apparatus as defined in claim 52 wherein,
said base assembly and a bottom surface defining said well, and an opposite facing bottom surface, said lower orifice extending from said bottom surface and an under orifice extending from said top surface into said well, and said synthesis apparatus further including:
a bottom chamber mechanism cooperating with said base bottom surface to form a bottom chamber enclosing said lower orifice therein, said pressure regulating device communicating with said bottom chamber to form a vacuum for regulation of said pressure differential.

59. The chemical synthesis apparatus as defined in claim 37 wherein,
each of said nozzles terminates proximate a substantially planar bottom surface of said head assembly,
said base assembly includes a substantially planar top surface in opposed relation to said head bottom surface, and
said first sliding seal is provided by a balloon seal having one end affixed to one of said head bottom surface and said base top surface, and an opposite end in sliding contact with the other of said base assembly top surface and said head assembly bottom surface.

60. The chemical synthesis apparatus as defined in claim 59 wherein,
said opposite end appears radially inwardly toward an interior portion of said chamber in a manner such that upon an increase in pressure in said chamber, the seal integrity between said opposite end and the other of said base assembly top surface and said head assembly bottom surface increases.

61. The chemical synthesis apparatus as defined in claim 37 wherein,
said reservoir, coupled to each said nozzle, comprises a plurality of independent reagent reservoirs each including a different reagent to be selectively and sequentially deposited in said well in a predetermined manner through a respective nozzle, and
a transport mechanism coupled to at least one of said base assembly and said head assembly to produce relative movement therebetween to position a reaction well and a selected one nozzle in alignment for deposition of a liquid reagent into said reaction wells for synthesis of a chemical compound.

62. The chemical synthesis apparatus as defined in claim 61 wherein,
said transport mechanism includes a stepped motor operably coupled to said base assembly for incremental movement and alignment of said wells with said nozzles for deposition of the selected reagent.

63. The chemical synthesis apparatus as defined in claim 61 wherein,
each nozzle communicates with a different reservoir through a tube having a passageway communicably coupled therebetween, and
each tube includes a valve assembly in-line with said passageway to control passage of the liquid reagent therethrough.

64. The chemical synthesis apparatus as defined in claim 63 wherein,
a controller assembly operably coupled to said transport mechanism and each valve assembly for controlled sequential movement of said wells relative each said nozzle and for deposition of said reagent solution therein.

65. The chemical synthesis apparatus as defined in claim 61 wherein,
including an inlet into said common chamber positioned upstream from said nozzles;
an outlet out of said common chamber positioned downstream from said nozzles; and
a pressurized gas source coupled to said inlet for continuously streaming a gas through a common chamber from said inlet to said outlet to sweep said chamber of fumes emitted by said reagents.

66. The chemical synthesis apparatus as defined in claim 65 wherein,
said inlet is positioned upstream of said nozzles by a sufficient distance such that said streaming through said common chamber is substantially laminar during passage thereby.

67. The chemical synthesis apparatus as defined in claim 66 wherein,
said independent reagent reservoirs are coupled to said nozzles in a manner aligning said reagents with increasing toxicity from said inlet to said outlet.

68. The chemical synthesis apparatus as defined in claim 35 wherein,
   a droplet of said liquid reagent expelled from any of said nozzles can be directed gravitationally to any of said wells.

69. The chemical synthesis apparatus as defined in claim 35 wherein,
   each said tip portion having a sufficient transverse cross-sectional dimension cooperating with a predetermined quantity of liquid reagent collected at said tip to produce said controlled droplet formation and delivery.

70. The chemical synthesis apparatus as defined in claim 37 wherein,
   said base assembly including a plurality of wells closely aligned in an array, and
   said first sliding seal enclosing said wells and said nozzles in said common chamber.

71. The chemical synthesis apparatus as defined in claim 70 wherein,
   said array is provided by a plurality of spaced-apart reaction well rows and reaction well columns, and
   said nozzles are aligned in an array having nozzle rows and nozzle columns spaced-apart by a distance substantially similar to the spacing between said spaced-apart reaction well rows and reaction well columns for alignment therebetween such that selected reaction wells may have simultaneously deposited therein selected reagent.

72. The chemical synthesis apparatus as defined in claim 36 wherein,
   said transport mechanism is formed to align any one nozzle with any one reaction well for simultaneous delivery of selected reagents from selected nozzles into selected reaction wells, and includes a stepped motor operably coupled to said base assembly for linear incremental movement of said wells along a path substantially perpendicular with said plurality of well columns for alignment with respective nozzles for deposition of the selected reagent.

73. The chemical synthesis apparatus as defined in claim 71 wherein,
   respective nozzles of each nozzle row are coupled to one reagent reservoir.

74. The chemical synthesis apparatus as defined in claim 71 wherein,
   each nozzle communicates with said different reservoir through a tube forming a passageway and having one end coupled to said nozzle and an opposite end terminating in one or more independent reagent reservoirs and
   each tube includes a valve assembly in-line with said passageway to control passage of the reagent solution therethrough.

75. The chemical synthesis apparatus as defined in claim 74 wherein,
   each of said independent reagent reservoirs contains a liquid reagent and is pressurized to expel said liquid reagent therefrom through respective tubes.

76. The chemical synthesis apparatus as defined in claim 74 wherein,
   a controller assembly operably coupled to said transport mechanism and each valve assembly for controlled sequential movement of said reaction wells relative each said nozzle and for deposition of said reagent solution therein.

77. The chemical synthesis apparatus as define in claim 71 wherein,
   said base assembly includes an array of reaction wells with at least one orifice extending into each reaction well, each orifice having an entrance into said reaction well and an exit, said exit being of a size and dimension to form a capillary liquid seal to retain deposited liquid reagent in selected reaction wells to enable chemical compound synthesis therein when a pressure differential between a first gas pressure in said common chamber and a second gas pressure exerted at each orifice exit is less than a predetermined amount.

78. The chemical synthesis apparatus as defined in claim 77 wherein,
   a pressure regulating device for controlling said pressure differential such that upon said pressure differential exceeding said predetermined amount, said reagent solution being expelled from said well through said orifice.

79. The chemical synthesis apparatus as defined in claim 78 wherein,
   said pressure regulating device includes an inlet into said common chamber positioned upstream from said array of nozzles, an outlet out of said common chamber positioned downstream from said array of nozzles, and a pressurized gas source coupled to said inlet for continuously streaming a gas from said gas source through said common chamber from said inlet to said outlet to sweep said chamber of fumes emitted by said reagents.

80. The chemical synthesis apparatus as defined in claim 79 wherein,
   said pressure regulating device further includes a chamber valve coupled to said outlet controlling outflow and said gas from said common chamber for one of raising said pressure differential above said predetermined amount and lowering said pressure differential below said predetermined amount.

81. The chemical synthesis apparatus as defined in claim 80 wherein,
   said inlet and said outlet are defined by said head assembly.

82. The chemical synthesis apparatus as defined in claim 81 wherein,
   said inlet is provided by an inlet slot extending substantially transversely across said common chamber such that said continuous stream is substantially laminar during passage by said array of nozzles.

83. The chemical synthesis apparatus as defined in claim 82 wherein,
   said outlet is provided by an outlet slot extending substantially transversely across said common chamber.

84. The chemical synthesis apparatus as defined in claim 36 wherein,
   a frame assembly upon which said head assembly is pivotally mounted between a closed position, sealing said common chamber and an open position, permitting access to said nozzles and said wells.

85. The chemical synthesis apparatus as defined in claim 84 wherein,
   said base assembly is movable mounted to said frame assembly, and
   said transport mechanism includes a stepped motor operably coupled to said base assembly for incremental movement and alignment of said well with said respective nozzle for deposition of the selected reagent.

86. A method of synthesis of a chemical compound in a synthesis apparatus by sequentially adding chemical units thereto, said synthesis apparatus including a head assembly having a plurality of nozzles mounted thereto in generally spaced-apart relation, each nozzle being coupled to a reservoir of liquid reagent for controlled delivery therethrough, a base assembly having a plurality of reaction wells, a sliding seal positioned between said head assembly and said base assembly to permit relative movement therebetween, and enclosing both said reaction well and said nozzles therein to form a common chamber, and a second sliding seal positioned between the nozzles and the head assembly, said method comprising the steps of:

A) aligning a reaction well and a selected one nozzle in a lateral X-direction through a transport mechanism coupled to at least one of said head assembly and said base assembly to produce relative movement therebetween;

B) aligning said reaction well and a selected one nozzle in a longitudinal Y-direction through a moveable slider holding said selected one nozzle, and coupled to said head assembly to produce relative motion between said slider and said head assembly;

C) depositing a liquid reagent into said well from said reagent reservoir through said one nozzle to enable synthesis of a chemical compound; and D) purging gaseous fumes or reaction by-products, emitted by said reagents, from said common chamber through passage of a gas from a pressurized gas source, coupled to an inlet into said common chamber and positioned upstream from said nozzles, and out of said chamber through an outlet out from said common chamber and positioned downstream from said nozzles, E) expelling said deposited liquid reagent from said well through an exit orifice of said well by applying a first gas pressure to said common chamber such that a pressure differential between said first gas pressure and second gas pressure exerted on said exit of said orifice exceeds a predetermined amount necessary to overcome a capillary liquid seal formed between said liquid reagent and orifice to retain said liquid reagent in said well, and F) repeating steps A–E to form at least one chemical compound from various chemical units.

87. The method of synthesis of chemical compounds as described in claim 86 wherein, said expelling step is accomplished by controlling out flow of said gas through said outlet to increase said pressure, to a degree exceeding said predetermined amount.

88. The method of synthesis of chemical compounds as described in claim 87 wherein, said controlling out flow is accomplished by a chamber valve coupled to said chamber outlet for control of passage of said gas therethrough.

89. The method of synthesis of chemical compounds as described in claim 86 wherein, steps A–C are repeated before the carrying out of purging step D, enabling a plurality of liquid reagents to simultaneously react in at least one reaction well.

90. The method of synthesis of chemical compounds as described in claim 86 wherein, said chemical compound is synthesized by the sequential addition of chemical units to at least one solid support for synthesizing and immobilizing a chemical compound thereon in a liquid reagent.

91. The method of synthesis of chemical compounds as described in claim 89 wherein, said chemical compound is synthesized by the sequential addition of chemical units to at least one solid support for synthesizing and immobilizing a chemical compound thereon in a liquid reagent.

92. The method of synthesis of chemical compounds as described in claim 90 wherein, said at least one solid support comprises at least one glass bead.

93. The method of synthesis of chemical compounds as described in claim 90 further comprising the step of:

E) transferring from at least one reaction well at least one solid support to a different reaction well.

94. The method of synthesis of chemical compounds as described in claim 93 further comprising the step of:

F) repeating steps A–E to form chemical compounds from various chemical units.

95. The method of synthesis of chemical compounds as described in claim 86 wherein, the integrity of the second sliding seal is increased by an increase in pressure in the common chamber.

* * * * *

UNITED STATES PATENT AND TRADEMARK OFFICE
CERTIFICATE OF CORRECTION

PATENT NO. : 6,001,311
DATED : December 14, 1999
INVENTOR(S) : Thomas M. Brennan Page 1 of 1

It is certified that error appears in the above-identified patent and that said Letters Patent is hereby corrected as shown below:

Column 6,
Line 3, delete "is".

Column 19,
After TABLE I and before TABLE II, insert Example 2 (pages 35 through 46) of the specification, attached.

Claim 58, column 27,
Line 47, after "assembly" insert -- includes a top surface --.
Line 50, delete "under" and insert therefor -- upper --.

Any overpayment to Deposit Account No. 06-1300

Signed and Sealed this

Twenty-third Day of October, 2001

Attest:

NICHOLAS P. GODICI
Attesting Officer   Acting Director of the United States Patent and Trademark Office